United States Patent
Wu et al.

(10) Patent No.: US 11,722,888 B2
(45) Date of Patent: Aug. 8, 2023

(54) SECURITY CONTEXT OBTAINING METHOD AND APPARATUS

(71) Applicant: HUAWEI TECHNOLOGIES CO., LTD., Guangdong (CN)

(72) Inventors: Rong Wu, Shenzhen (CN); Shuaishuai Tan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 311 days.

(21) Appl. No.: 17/179,820

(22) Filed: Feb. 19, 2021

(65) Prior Publication Data

US 2021/0185524 A1    Jun. 17, 2021

Related U.S. Application Data

(63) Continuation of application No. PCT/CN2019/105019, filed on Sep. 10, 2019.

(30) Foreign Application Priority Data

Sep. 15, 2018 (CN) .......................... 201811077345.1

(51) Int. Cl.
*H04W 12/03* (2021.01)
*H04W 12/033* (2021.01)
(Continued)

(52) U.S. Cl.
CPC ..... *H04W 12/033* (2021.01); *H04W 12/0433* (2021.01); *H04W 36/0038* (2013.01); *H04W 88/16* (2013.01)

(58) Field of Classification Search
CPC ........... H04W 12/033; H04W 12/0433; H04W 36/0038; H04W 88/16
(Continued)

(56) References Cited

U.S. PATENT DOCUMENTS

2008/0176572 A1    7/2008  Forsberg
2017/0318458 A1*  11/2017  Laselva ................. H04W 12/06
(Continued)

FOREIGN PATENT DOCUMENTS

CN    107666666 A    2/2018
CN    107820283 A    3/2018
(Continued)

OTHER PUBLICATIONS

Huawei, HiSilicon, Security consideration for UL small data transmission. 3GPP TSG-RAN WG2 # 98, Hangzhou, China, May 15-19, 2017, R2-1704892, 6 pages.
(Continued)

*Primary Examiner* — Joel Ajayi

(57) ABSTRACT

This application provides a security context obtaining method and apparatus. The method includes: receiving, by a user plane gateway, a PDU session establishment request from UE, where the PDU session establishment request is used to request to establish a PDU session between the user plane gateway and the UE, and the PDU session is carried between the UE and a service server of a data network; and separately obtaining, by the user plane gateway and the UE, a security context used for the PDU session, and activating user plane security protection based on the security context. Therefore, during PDU session reestablishment, for example, PDU session reestablishment triggered by switching of the user plane gateway, a session management network element, and the like, the user plane gateway and the UE can obtain a new security context, thereby achieving end-to-end protection between the UE and the user plane gateway.

8 Claims, 4 Drawing Sheets

(51) Int. Cl.
*H04W 12/0433* (2021.01)
*H04W 36/00* (2009.01)
*H04W 88/16* (2009.01)

(58) Field of Classification Search
USPC .......................................................... 455/410
See application file for complete search history.

(56) References Cited

U.S. PATENT DOCUMENTS

| | | | | |
|---|---|---|---|---|
| 2019/0068625 | A1* | 2/2019 | Alfano | ................. H04W 12/60 |
| 2019/0166493 | A1 | 5/2019 | You et al. | |

FOREIGN PATENT DOCUMENTS

| | | |
|---|---|---|
| CN | 108347410 A | 7/2018 |
| CN | 108347416 A | 7/2018 |
| CN | 108370600 A | 8/2018 |
| CN | 110830991 A | 2/2020 |
| WO | 2010069402 A1 | 6/2010 |
| WO | 2018019046 A1 | 2/2018 |
| WO | 2018059043 A1 | 4/2018 |
| WO | 2018111029 A1 | 6/2018 |
| WO | 2018127190 A1 | 7/2018 |
| WO | 2018132050 A1 | 7/2018 |

OTHER PUBLICATIONS

Huawei, HiSilicon, Nokia, CaTT, Description of Policy Association. 3GPP TSG-SA WG2 Meeting #127, Sanya, China, Apr. 16-Apr. 20, 2018, S2-184199, 53 pages.
Sony, Evaluation of Solution 6. SA WG2 Meeting #128, Jul. 2-6, 2018, Vilnius, LT, S2-187284, 12 pages.
Extended European Search Report issued in EP19860091.8, dated Aug. 9, 2021,12 pages.
ZTE,"Update for Solution 5: Small Data Fast Path communication", SA WG2 Meeting #128 S2-186602, Jul. 2-6, 2018, Vilnius, Lithuania, Total 9 pages.
Ericsson,"PCR 23.724: Infrequent Small Data user plane transmission for CIoT",SA WG2 Meeting #126 S2-183041, Feb. 26-Mar. 2, 2018, Montreal, Canada,Total 6 pages.
3GPP TS 23.501 V15.2.0 (Jun. 2018), 3rd Generation Partnership Project; Technical Specification Group Services and System Aspects; System Architecture for the 5G System; Stage 2 (Release 15), total 217 pages.
3GPP TS 23.502 V15.2.0 (Jun. 2018), 3rd Generation Partnership Project; Technical Specification Group Services and System Aspects; Procedures for the 5G System; Stage 2 (Release 15), total 308 pages.
3GPP TS 23.503 V15.2.0: "3rd Generation Partnership Project; Technical Specification Group Services and System Aspects; Policy and Charging Control Framework for the 5G System; Stage 2 (Release 15)", Jun. 2018, total 67 pages.
International Search Report and Written Opinion issued in PCT/CN2019/105019, dated Nov. 27, 2019, total 10 pages.
Office Action issued in CN Application No. 2018110773451, dated Jan. 15, 2021 and English translation, total 8 pages.
Office Action issued in CN 201811077345.1, dated May 19, 2021, total 8 pages.
SA WG2 Meeting #120,S2-171626,Draft Report of SA WG2 meetings #119,Secretary of SA WG2.Mar. 27-31, 2017, Busan, South Korea,total 313 pages.
Notice of Allowance issued in Chinese Application 201811077345.1 dated Jan. 13, 2022 (5 pages).

* cited by examiner

SECURITY CONTEXT OBTAINING METHOD AND APPARATUS

CROSS-REFERENCE TO RELATED APPLICATIONS

This application is a continuation of International Application No. PCT/CN2019/105019, filed on Sep. 10, 2019, which claims priority to Chinese Patent Application No. 201811077345.1, filed on Sep. 15, 2018. The disclosures of the aforementioned applications are hereby incorporated by reference in their entireties.

TECHNICAL FIELD

This application relates to the wireless communications field, and more specifically, to a security context obtaining method and apparatus.

BACKGROUND

Mobile communication security is increasingly concerned. In a data transmission process, a transmit end may perform encryption protection and integrity protection on to-be-transmitted data, and a receive end may perform decryption and integrity verification on received encrypted data, so that data privacy and integrity can be ensured.

For example, during uplink transmission, user equipment (UE) may send data to an access network device after completing encryption and integrity protection on the data, and the access network device can perform decryption and integrity verification on the data. After completing decryption and integrity verification on the data, the access network device transmits the data through a secure path between the access network device and a core network device, for example, a user plane gateway. The core network device performs operations such as internet protocol (IP) address assignment and charging, and sends data to an internet server.

However, there is a security risk if the data is transmitted through the secure path after being decrypted by the access network device. In addition, in some cases, a user plane gateway or another core network element may need to be switched due to reasons such as a network load and a service requirement. This is more unfavorable for secure data transmission.

SUMMARY

This application provides a security context obtaining method and apparatus, to improve data transmission security.

According to a first aspect, a security context obtaining method is provided. The method includes: receiving, by a user plane gateway, a third packet data unit (PDU) session establishment request from a session management network element, where the third PDU session establishment request is used to request to establish a PDU session between the user plane gateway and user equipment (UE), and the PDU session is carried between the UE and a service server of a data network; obtaining, by the user plane gateway, a security context used for the PDU session; and activating, by the user plane gateway, user plane security protection based on the security context.

The UE may be located at one end of the user plane gateway, and the service server of the data network may be located at the other end of the user plane gateway. Therefore, data transmitted by the UE to the user plane gateway may be output to the service server of the data network, and data transmitted by the service server of the data network to the user plane gateway may be output to the UE.

Based on the foregoing method, the UE and a network side complete user plane gateway switching and PDU session reestablishment. The UE and the network side complete user plane gateway switching, session management network element switching, and PDU session reestablishment. Based on a newly established PDU session, secure data transmission may be performed between the UE and a new user plane gateway based on a new security context, thereby implementing end-to-end security protection between the UE and the user plane gateway.

It should be noted that this embodiment of this application is merely an example, and a specific process of obtaining the security context during user plane gateway switching is described in detail by using user plane security protection deployed between the UE and the user plane gateway as an example. For example, the user plane gateway may also be replaced with a network element, such as a serving gateway (SGW), a public data network (PDN) gateway (PGW), a PDU session anchor, a session proxy, or a local breakout server (LBO server), that may be used to transmit or route user plane data or another network element that may be used to implement a same or similar function.

With reference to the first aspect, in some possible implementations of the first aspect, the obtaining, by the user plane gateway, a security context used for the PDU session includes: obtaining, by the user plane gateway, a shared security context from the session management network element, where the shared security context is a security context corresponding to the UE; and determining, by the user plane gateway, the shared security context as the security context.

The shared security context may be generated based on UE granularity. That is, the shared security context corresponds to the UE. When the UE remains unchanged, all network elements may share a same security context, and do not need to generate a new security context based on each time of PDU session reestablishment. This is relatively convenient.

With reference to the first aspect, in some possible implementations of the first aspect, the security context includes a security key. The obtaining, by the user plane gateway, a security context used for the PDU session includes: receiving, by the user plane gateway, the security key from the session management network element.

The security key may be generated by an access and mobility management network element or the session management network element and sent by the access and mobility management network element or the session management network element to the user plane gateway.

With reference to the first aspect, in some possible implementations of the first aspect, the security context includes a security key. The obtaining, by the user plane gateway, a security context used for the PDU session includes: receiving, by the user plane gateway, a UPF transmission root key used to generate the security key; and generating, by the user plane gateway, the security key based on the UPF transmission root key.

The security key may be generated by the user plane gateway. The access and mobility management network element or the session management network element may generate the UPF transmission root key and send the UPF transmission root key to the user plane gateway, so that the user plane gateway generates the security key.

With reference to the first aspect, in some possible implementations of the first aspect, the security context includes a security key. The obtaining, by the user plane gateway, a security context used for the PDU session includes: receiving, by the user plane gateway, an intermediate key and an input parameter; and generating, by the user plane gateway, the UPF transmission root key based on the intermediate key and the input parameter, and generating the security key based on the UPF transmission root key.

The security key may be generated by the user plane gateway. The access and mobility management network element may send, to the user plane gateway, the intermediate key and the input parameter that are used to generate the UPF transmission root key, so that the user plane gateway generates the UPF transmission root key, and further generates the security key.

According to a second aspect, a security context obtaining method is provided. The method includes: sending, by UE, a first PDU session establishment request to an access and mobility management network element, where the first PDU session establishment request is used to request to establish a target PDU session between a user plane gateway and the UE, and the target PDU session is carried between the UE and a service server of a data network; obtaining, by the UE, a security context used for the target PDU session; and activating, by the UE, user plane security protection based on the security context.

The UE may be located at one end of the user plane gateway, and the service server of the data network may be located at the other end of the user plane gateway. Therefore, data transmitted by the UE to the user plane gateway may be output to the service server of the data network, and data transmitted by the service server of the data network to the user plane gateway may be output to the UE.

Based on the foregoing method, the UE and a network side complete user plane gateway switching and PDU session reestablishment. The UE and the network side complete user plane gateway switching, session management network element switching, and PDU session reestablishment. Based on a newly established PDU session, secure data transmission may be performed between the UE and a new user plane gateway based on a new security context, thereby implementing end-to-end security protection between the UE and the user plane gateway.

It should be noted that this embodiment of this application is merely an example, and a specific process of obtaining the security context during user plane gateway switching is described in detail by using user plane security protection deployed between the UE and the user plane gateway as an example. For example, the user plane gateway may be replaced with a network element, such as an SGW, a PGW, a PDU session anchor session proxy, or a local breakout server, that may be used to transmit or route user plane data or another network element that may be used to implement a same or similar function.

With reference to the second aspect, in some possible implementations of the second aspect, the security context includes a security key. The obtaining, by the UE, the security key includes: receiving, by the UE, an index of the security key; and determining, by the UE, the security key in a plurality of pre-generated security keys based on the index.

To be specific, the UE may pre-generate the plurality of security keys, and determine, based on the index indicated by the access and mobility management network element, the security key used for the target PDU session.

With reference to the second aspect, in some possible implementations of the second aspect, the security context includes a security key. The obtaining, by the UE, the security key includes: receiving, by the UE, an input parameter; and generating, by the UE, a UPF transmission root key based on the input parameter, and generating the security key based on the UPF transmission root key.

The UE may alternatively generate a new security key based on each time of PDU session reestablishment, so that security is higher.

With reference to the second aspect, in some possible implementations of the second aspect, the security context is a pre-generated shared security context, and the shared security context corresponds to the UE.

The shared security context may be generated based on UE granularity. That is, the shared security context corresponds to the UE. When the UE remains unchanged, all network elements may share a same security context, and do not need to generate a new security context based on each time of PDU session reestablishment. This is relatively convenient.

With reference to the second aspect, in some possible implementations of the second aspect, the method further includes: receiving, by the UE, a non-access stratum (NAS) message from the access and mobility management network element, where the NAS message is used to indicate to reestablish the PDU session.

Optionally, the NAS message carries a PDU session modification command.

Optionally, the NAS message carries a PDU session release command.

With reference to the second aspect, in some possible implementations of the second aspect, the method further includes: deleting, by the UE, a security context used for a source PDU session, where a link carrying the target PDU session is different from a link carrying the source PDU session in at least one of the following: a user plane gateway, a session management network element, and an access and mobility management network element.

Because the security context related to the source PDU session is deleted, security context information related to the old PDU session can be prevented from being obtained by a third party. Therefore, security is higher.

According to a third aspect, a security context obtaining method is provided. The method includes: receiving, by an access and mobility management network element, a first PDU session establishment request from UE, where the first PDU session establishment request is used to request to establish a target PDU session between a user plane gateway and the UE, and the target PDU session is carried between the UE and a service server of a data network; sending, by the access and mobility management network element, a second PDU session establishment request to a session management network element based on the first PDU session establishment request, where the second PDU session establishment request is used to request to establish a PDU session; and sending, by the access and mobility management network element, information about a security context, where the security context is a security context used for the target PDU session.

The UE may be located at one end of the user plane gateway, and the service server of the data network may be located at the other end of the user plane gateway. Therefore, data transmitted by the UE to the user plane gateway may be output to the service server of the data network, and data transmitted by the service server of the data network to the user plane gateway may be output to the UE.

Based on the foregoing method, the UE and a network side complete user plane gateway switching and PDU session reestablishment. The UE and the network side complete user plane gateway switching, session management network element switching, and PDU session reestablishment. Based on a newly established PDU session, secure data transmission may be performed between the UE and a new user plane gateway based on a new security context, thereby implementing end-to-end security protection between the UE and the user plane gateway.

It should be noted that this embodiment of this application is merely an example, and a specific process of obtaining the security context during user plane gateway switching is described in detail by using user plane security protection deployed between the UE and the user plane gateway as an example. For example, the user plane gateway may be replaced with a network element, such as an SGW, a PGW, a PDU session anchor session proxy, or a local breakout server, that may be used to transmit or route user plane data or another network element that may be used to implement a same or similar function.

With reference to the third aspect, in some possible implementations of the third aspect, the security context includes a security key. The sending, by the access and mobility management network element, information about a security context includes: determining, by the access and mobility management network element in a plurality of pre-generated security keys, a security key used for the target PDU session; sending, by the access and mobility management network element, an index of the security key to the UE; and sending, by the access and mobility management network element, the security key to a user plane gateway.

To be specific, the access and mobility management network element may pre-generate the plurality of security keys, determine, in the plurality of sets of security keys, the security key used for the target PDU session, and send the security key to the user plane gateway via the session management network element. In addition, the access and mobility management network element sends the index of the security key to the UE, so that the UE determines the security key used for the target PDU session.

With reference to the third aspect, in some possible implementations of the third aspect, the security context includes a security key. The sending, by the access and mobility management network element, information about a security context includes: generating, by the access and mobility management network element, the security key; sending, by the access and mobility management network element, the security key to the user plane gateway; and sending, by the access and mobility management network element to the UE, an input parameter used to generate a UPF transmission root key, where the UPF transmission root key is used to generate the security key.

With reference to the third aspect, in some possible implementations of the third aspect, the security context includes a security key. The sending, by the access and mobility management network element, information about a security context includes: sending, by the access and mobility management network element to the UE, an input parameter used to generate a UPF transmission root key, where the UPF transmission root key is used to generate the security key; and sending, by the access and mobility management network element to the user plane gateway, an intermediate key and the input parameter that are used to generate the UPF transmission root key.

Alternatively, the access and mobility management network element may generate or determine, based on each time of PDU session reestablishment, an input parameter used to generate a new security key, and notify the UE and the user plane gateway, so that the UE and the user plane gateway generate a security key.

With reference to the third aspect, in some possible implementations of the third aspect, the method further includes: receiving, by the access and mobility management network element, a switching request from the session management network element, where the switching request is used to request to switch the user plane gateway.

In other words, after determining that the user plane gateway needs to be switched, the session management network element may send a switching request to the access and mobility management network element, to trigger PDU session reestablishment.

With reference to the third aspect, in some possible implementations of the third aspect, the method further includes: receiving, by the access and mobility management network element, a switching request from the session management network element, where the switching request is used to request to switch the session management network element and the user plane gateway.

In other words, after determining that the session management network element and the user plane gateway need to be switched, the session management network element may send a switching request to the access and mobility management network element, to trigger PDU session reestablishment.

It should be understood that the session management network element may alternatively request, by using a switching request, to switch the session management network element but not request to switch the user plane gateway. This is not limited in this application.

With reference to the third aspect, in some possible implementations of the third aspect, the method further includes: sending, by the access and mobility management network element, a NAS message to the UE, where the NAS message is used to indicate that the PDU session needs to be reestablished.

Optionally, the NAS message carries a PDU session modification command.

Optionally, the NAS message carries a PDU session release command.

With reference to the third aspect, in some possible implementations of the third aspect, the method further includes: receiving, by the access and mobility management network element, a switching request from an access network device, where the switching request is used to request to switch the access and mobility management network element.

The access network device may determine, based on an operator policy and/or a network deployment coverage situation, whether the access and mobility management network element needs to be switched, and send a switching request to a source access and mobility management network element if the access and mobility management network element needs to be switched. Therefore, an appropriate access and mobility management network element can be selected based on movement of the UE, to provide a better service for the UE.

With reference to the third aspect, in some possible implementations of the third aspect, the access and mobility management network element is a source access and mobility management network element; and the method further includes: sending, by the access and mobility management network element, a source security context to a target access and mobility management network element.

The source access and mobility management network element is an access and mobility management network element before the switching, and the target access and mobility management network element is an access and mobility management network element after the switching.

With reference to the third aspect, in some possible implementations of the third aspect, the method further includes: deleting, by the access and mobility management network element, a security context used for a source PDU session, where a link carrying the target PDU session is different from a link carrying the source PDU session in at least one of the following: a user plane gateway, a session management network element, and an access and mobility management network element.

Because the security context related to the source PDU session is deleted, security context information related to the old PDU session can be prevented from being obtained by a third party. Therefore, security is higher.

According to a fourth aspect, a security context obtaining method is provided. The method includes: receiving, by a session management network element, a second PDU session establishment request from an access and mobility management network element, where the second PDU session establishment request is used to request to establish a target PDU session between a user plane gateway and UE, and the target PDU session is carried between the UE and a service server of a data network; sending, by the session management network element, a third PDU session establishment request to the user plane gateway based on the second PDU session establishment request, where the third PDU session establishment request is used to request to establish a PDU session; receiving, by the session management network element, information about a security context from the access and mobility management network element, where the security context is a security context used for the target PDU session; and sending, by the session management network element, the information about the security context to the user plane gateway.

The UE may be located at one end of the user plane gateway, and the service server of the data network may be located at the other end of the user plane gateway. Therefore, data transmitted by the UE to the user plane gateway may be output to the service server of the data network, and data transmitted by the service server of the data network to the user plane gateway may be output to the UE.

Based on the foregoing method, the user plane gateway may obtain the security context based on the information about the security context sent by the session management network element. In this way, the UE and a network side complete user plane gateway switching and PDU session reestablishment. The UE and the network side complete user plane gateway switching, session management network element switching, and PDU session reestablishment. Based on a newly established PDU session, secure data transmission may be performed between the UE and a new user plane gateway based on a new security context, thereby implementing end-to-end security protection between the UE and the user plane gateway.

It should be noted that this embodiment of this application is merely an example, and a specific process of obtaining the security context during user plane gateway switching is described in detail by using user plane security protection deployed between the UE and the user plane gateway as an example. For example, the user plane gateway may be replaced with a network element, such as an SGW, a PGW, a PDU session anchor session proxy, or a local breakout server, that may be used to transmit or route user plane data or another network element that may be used to implement a same or similar function.

With reference to the fourth aspect, in some possible implementations of the fourth aspect, the security context includes a security key. The receiving, by the session management network element, information about a security context from the access and mobility management network element includes: receiving, by the session management network element, the security key from the access and mobility management network element. The sending, by the session management network element, the information about the security context to the user plane gateway includes: sending, by the session management network element, the security key to the user plane gateway.

The security key may be generated based on a new PDU session establishment procedure, or may be selected from a plurality of pre-generated security keys. This is not limited in this application.

With reference to the fourth aspect, in some possible implementations of the fourth aspect, the security context includes a security key. The receiving, by the session management network element, information about a security context from the access and mobility management network element includes: receiving, by the session management network element, a UPF transmission root key from the access and mobility management network element. The sending, by the session management network element, the information about the security context to the user plane gateway includes: sending, by the session management network element, the UPF transmission root key to the user plane gateway; or generating, by the session management network element, the security key based on the UPF transmission root key, and sending the security key to the user plane gateway.

With reference to the fourth aspect, in some possible implementations of the fourth aspect, the security context includes a security key. The receiving, by the session management network element, information about a security context from the access and mobility management network element includes: receiving, by the session management network element, an intermediate key and an input parameter from the access and mobility management network element, where the intermediate key and the input parameter are used to generate a UPF transmission root key. The sending, by the session management network element, the information about the security context to the user plane gateway includes: sending, by the session management network element, the intermediate key and the input parameter to the user plane gateway; generating, by the session management network element, the UPF transmission root key based on the intermediate key and the input parameter, and sending the UPF transmission root key to the user plane gateway; or generating, by the session management network element, the UPF transmission root key based on the intermediate key and the input parameter, generating the security key based on the UPF transmission root key, and sending the security key to the user plane gateway.

Therefore, the user plane gateway may generate a new security key based on each time of PDU session establishment, and security is higher.

With reference to the fourth aspect, in some possible implementations of the fourth aspect, the method further includes: sending, by the session management network element, a switching request to the access and mobility management network element, where the switching request is used to request to switch the user plane gateway.

In other words, after determining that the user plane gateway needs to be switched, the session management network element may send a switching request to the access and mobility management network element, to trigger PDU session reestablishment.

With reference to the fourth aspect, in some possible implementations of the fourth aspect, the method further includes: sending, by the session management network element, a switching request to the access and mobility management network element, where the switching request is used to request to switch the session management network element and the user plane gateway.

In other words, after determining that the session management network element and the user plane gateway need to be switched, the session management network element may send a switching request to the access and mobility management network element, to trigger PDU session reestablishment.

It should be understood that the session management network element may alternatively request, by using a switching request, to switch the session management network element but not request to switch the user plane gateway. This is not limited in this application.

With reference to the fourth aspect, in some possible implementations of the fourth aspect, the method further includes: deleting, by the session management network element, a security context used for a source PDU session, where a link carrying the target PDU session is different from a link carrying the source PDU session in at least one of the following: a user plane gateway, a session management network element, and an access and mobility management network element.

Because the security context related to the source PDU session is deleted, security context information related to an old PDU session can be prevented from being obtained by a third party. Therefore, security is higher.

According to a fifth aspect, a security context obtaining apparatus is provided. The apparatus includes modules or units configured to perform the method in any possible implementation of the first aspect to the fourth aspect.

According to a sixth aspect, a security context obtaining device is provided. The device includes a processor. The processor is coupled to a memory, and may be configured to execute an instruction in the memory, to implement the method in any possible implementation of the first aspect to the fourth aspect. Optionally, the security context obtaining device further includes a memory. Optionally, the security context obtaining device further includes a communications interface, and the processor is coupled to the communications interface.

In an implementation, the security context obtaining device is a communications device, such as the UE, the user plane gateway, the session management network element, or the access and mobility management network element in the embodiments of this application. When the security context obtaining device is a communications device, the communications interface may be a transceiver or an input/output interface.

In another implementation, the security context obtaining device is a chip configured in a communications device, such as a chip configured in the UE, the user plane gateway, the session management network element, or the access and mobility management network element in the embodiments of this application. When the security context obtaining device is a chip configured in a communications device, the communications interface may be an input/output interface.

Optionally, the transceiver may be a transceiver circuit. Optionally, the input/output interface may be an input/output circuit.

According to a seventh aspect, a processor is provided, including an input circuit, an output circuit, and a processing circuit. The processing circuit is configured to: receive a signal by using the input circuit, and transmit a signal by using the output circuit, so that the processor performs the method in any possible implementation of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, and the circuit is used as the input circuit and the output circuit at different moments. Specific implementations of the processor and the various circuits are not limited in this embodiment of this application.

According to an eighth aspect, a processing apparatus is provided, including a processor and a memory. The processor is configured to: read an instruction stored in the memory, receive a signal by using a receiver, and transmit a signal by using a transmitter, to perform the method in any possible implementation of the first aspect to the fourth aspect.

Optionally, there are one or more processors and one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner for disposing the memory and the processor are not limited in this embodiment of this application.

It should be understood that a related data exchange process, for example, sending of indication information, may be a process of outputting indication information from the processor, and receiving of capability information, may be a process of receiving input capability information by the processor. Specifically, data output by the processor may be output to the transmitter, and input data received by the processor may be from the receiver. The transmitter and the receiver may be collectively referred to as a transceiver.

The processing apparatus in the eighth aspect may be a chip. The processor may be implemented by using hardware, or may be implemented by using software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, may be located outside the processor, or may exist independently.

According to a ninth aspect, a computer program product is provided. The computer program product includes a computer program (which may also be referred to as code or an instruction). When the computer program is run on a computer, the computer is enabled to perform the method in any possible implementation of the first aspect to the fourth aspect.

According to a tenth aspect, a computer-readable medium is provided. The computer-readable medium stores a computer program (which may also be referred to as code or an instruction). When the computer program is run on a computer, the computer is enabled to perform the method in any possible implementation of the first aspect to the fourth aspect.

According to an eleventh aspect, a communications system is provided, including the UE, the user plane gateway, the session management network element, the access network element, the mobility management network element, and the access network device that are described above.

DESCRIPTION OF EMBODIMENTS

The following describes technical solutions of this application with reference to the accompanying drawings.

The technical solutions in embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system UMTS, a worldwide interoperability for microwave access (WiMAX) communications system, and a future fifth generation (5G) system or new radio (NR) system.

It should be understood that a specific structure of an entity for performing a method provided in the embodiments of this application is not particularly limited in the embodiments of this application, provided that a program recording code of the method provided in the embodiments of this application can be run to perform communication according to the method provided in the embodiments of this application. For example, the entity for performing the method provided in the embodiments of this application may be user equipment (UE) or a network device, or may be a functional module capable of invoking and executing the program in UE or a network device.

For ease of understanding of the embodiments of this application, an application scenario of the embodiments of this application is first described in detail with reference to FIG. 1.

Figure 1:
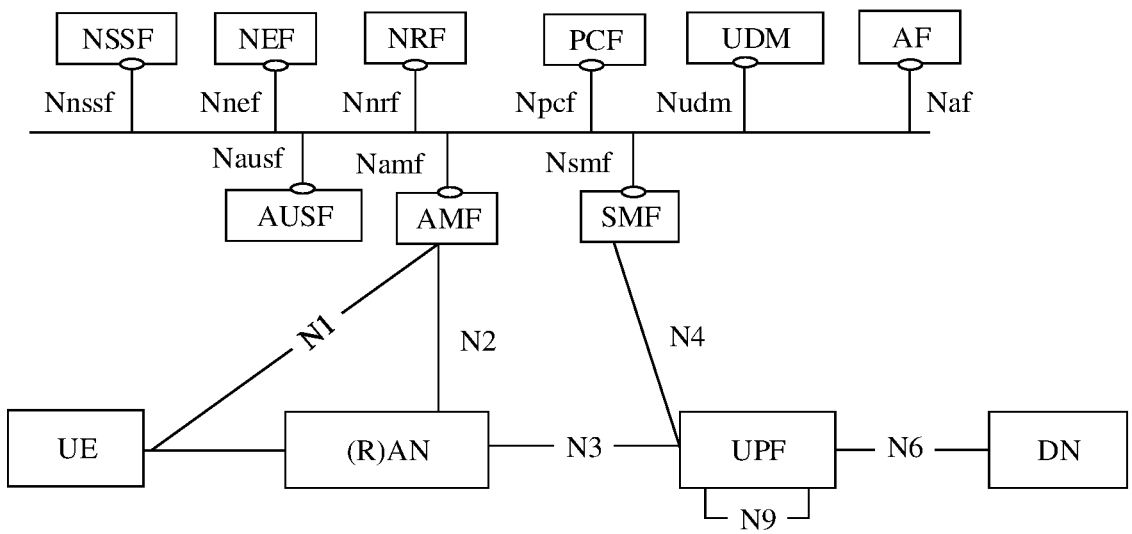
FIG. 1 is a schematic diagram of a network architecture applicable to a method according to an embodiment of this application.

FIG. 1 is a schematic diagram of a network architecture applicable to a method according to an embodiment of this application. As shown in the figure, the network architecture may be, for example, a non-roaming architecture. The network architecture may specifically include the following network elements: user equipment (UE), an access network (AN) entity, a session management function (SMF) entity, a user plane function (UPF) entity, a data network (DN), an authentication server function (AUSF) entity, a network exposure function (NEF) entity, a network function repository function (NRF) entity, a policy control function (PCF) entity, a unified data management (UDM) entity, and an application function (AF) entity.

1. The user equipment (UE) may be referred to as a terminal device, a terminal, an access terminal, a subscriber unit, a subscriber station, a mobile station, a mobile console, a remote station, a remote terminal, a mobile device, a user terminal, a wireless communications device, a user agent, or a user apparatus. The UE may alternatively be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a future 5G network or a terminal device in a future evolved public land mobile communications network (PLMN), or the like; or may be a terminal device, a logical entity, an intelligent device such as a mobile phone, a terminal device such as a smart terminal, a communications device such as a server, a gateway, a base station, or a controller, or an internet of things (IoT) device such as a sensor, an electricity meter, or a water meter. This is not limited in this embodiment of this application.

In this embodiment of this application, the UE stores a long term key. When performing mutual authentication with a core network element (for example, an access and mobility management function entity and an authentication server function (AUSF) entity described below), the UE verifies authenticity of a network by using a long term key and a related function. In this way, data transmission security can be ensured.

2. The access network (AN) is used to provide a network access function for an authorized user in a specific area, and can use transmission tunnels with different quality based on user levels, service requirements, and the like. Different access networks may use different access technologies. Currently, there are two types of radio access technologies: a third generation partnership project (3GPP) access technology (for example, a radio access technology used in a 3G, 4G, or 5G system) and a non-3GPP access technology. The 3GPP access technology is an access technology that complies with a 3GPP standard specification. An access network using the 3GPP access technology is referred to as a radio access network (RAN), and an access network device in a 5G system is referred to as a next-generation node base station (gNB). The non-3GPP access technology is an access technology that does not comply with the 3GPP standard specification, for example, an air interface technology represented by a Wi-Fi access point (AP).

An access network that implements a network access function based on a wireless communications technology may be referred to as a radio access network (RAN). The radio access network can manage radio resources, provide an access service for a terminal, and further complete forwarding of a control signal and user data between the terminal and a core network.

The radio access network may be, for example, a base station (NodeB), an evolved base station (evolved NodeB, eNB or eNodeB), a base station (gNB) in a 5G mobile communications system, a base station in a future mobile communications system, or an AP in a Wi-Fi system, or may be a radio controller in a cloud radio access network (CRAN) scenario, or may be a relay station, an access point, a vehicle-mounted device, a wearable device, a network device in a future 5G network, a network device in a future evolved PLMN network, or the like. A specific technology and a specific device form used by the radio access network device are not limited in this embodiment of this application.

3. The access and mobility management function (AMF) entity is mainly used for mobility management, access management, and the like, and may be used to implement a function other than session management in functions of a mobility management entity (MME), for example, a function of lawful interception or access authorization (or authentication). In the embodiments of this application, the AMF entity may be configured to implement functions of an access and mobility management network element.

4. The session management function (SMF) entity is mainly used for session management, internet protocol (IP) address assignment and management of UE, manageable user plane function selection, a termination point of a policy control and charging function interface, a downlink data notification, and the like. In the embodiments of this application, the SMF entity may be configured to implement functions of a session management network element.

5. The user plane function (UPF) entity is a data plane gateway, and may be used for packet routing and forwarding, quality of service (QoS) processing of user plane data, or the like. User data may be accessed to a data network (DN) by using this network element. In the embodiments of this application, the UPF entity may be configured to implement functions of a user plane gateway.

6. The data network (DN) is a network that provides data transmission, for example, an operator specific service network, the internet, and a third-party service network.

7. The authentication server function (AUSF) entity is mainly used for user authentication and the like.

8. The network exposure function (NEF) entity is used to securely open, to outside, a service and a capability that are provided by a 3GPP network function.

9. The network repository function (NRF) entity is used to store description information of a network function entity and a service provided by the network function entity, and support service discovery, network element entity discovery, and the like.

10. The policy control function (PCF) entity is a unified policy framework used for instructing network behavior, and provides policy rule information and the like for control plane function network elements (such as AMF and SMF network elements).

11. The unified data management (UDM) entity is used for user identifier processing, access authentication, registration, mobility management, and the like.

12. The application function (AF) entity is used to perform data routing affected by an application, access a network exposure function network element, or interact with a policy framework to perform policy control and so on.

In the network architecture, an N1 interface is a reference point between a terminal and the AMF entity; an N2 interface is a reference point between the AN entity and the AMF entity, and is used to send a non-access stratum (NAS) message and so on; an N3 interface is a reference point between the (R)AN entity and the UPF entity, and is used to transmit user plane data and so on; an N4 interface is a reference point between the SMF entity and the UPF entity, and is used to transmit information such as tunnel identifier information of an N3 connection, data buffering indication information, and a downlink data notification message; and an N6 interface is a reference point between the UPF entity and the DN, and is used to transmit user plane data and so on.

It should be understood that the foregoing network architecture applied to this embodiment of this application is merely an example of a network architecture described from the perspective of a conventional point-to-point architecture and a service architecture, and a network architecture applicable to this embodiment of this application is not limited thereto. Any network architecture that can implement functions of the foregoing network elements is applicable to this embodiment of this application.

It should be further understood that the AMF entity, the SMF entity, the UPF entity, a network slice selection function (NSSF) entity, the NEF entity, the AUSF entity, the NRF entity, the PCF entity, and the UDM entity that are shown in FIG. 1 may be understood as network elements configured to implement different functions in a core network. For example, network slices may be combined as required. These core network elements may be independent devices, or may be integrated into a same device to implement different functions. This is not limited in this application.

For ease of description, an entity configured to implement an AMF is denoted as an access and mobility management network element, an entity configured to implement an SMF is denoted as a session management network element, an entity configured to implement a UPF is denoted as a user plane gateway, and an entity configured to implement a UDM function is denoted as a unified data management network element, and an entity configured to implement a PCF is denoted as a policy control network element in the following description. It should be understood that the foregoing names are merely used to distinguish between different functions, and do not indicate that these network elements are independent physical devices. Specific forms of the foregoing network elements are not limited in this application. For example, the network elements may be integrated into a same physical device, or may be different physical devices. In addition, the foregoing names are merely used to distinguish between different functions, and shall not constitute any limitation on this application. This application does not exclude a possibility of using another name in a 5G network and another future network. For example, in a 6G network, terms in 5G may still be used for some or all of the foregoing network elements, or other names may be used. Uniform descriptions are provided herein, and details are not described below again.

It should be further understood that names of interfaces between the foregoing network elements in FIG. 1 are only examples, and the interfaces may have other names during specific implementation. This is not specifically limited in this application. In addition, names of messages (or signaling) transmitted between the foregoing network elements are merely examples, and do not constitute any limitation on functions of the messages.

Figure 2:
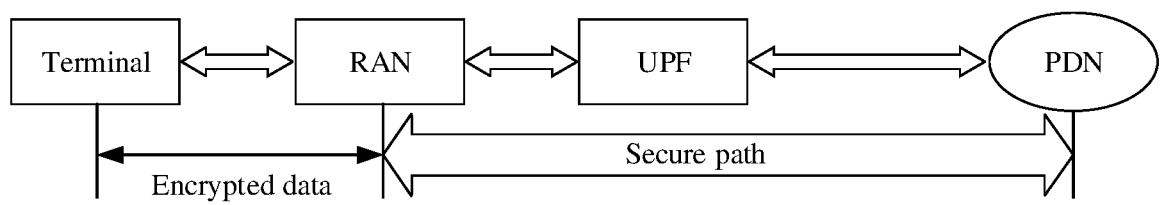
FIG. 2 is a schematic diagram of a small data fast path (SDFP) transmission scheme.

FIG. 2 is a schematic diagram of small data transmission. Specifically, FIG. 2 is a schematic diagram of a small data fast path (SDFP) transmission scheme. Small data can be quickly transmitted over N3 and N6 interfaces on a dedicated path of a terminal→an access network→a user plane gateway.

However, in a current technology, small data is transmitted to an access network device after encryption and integrity protection are performed on the small data on the terminal side. After performing decryption and integrity verification on the encrypted data, the access network device may transmit the encrypted data to a user plane gateway through a secure path. The small data transmitted to the user plane gateway is routed and forwarded to a public data network (PDN) by the user plane gateway.

In a transmission process of small data, the access network device is usually responsible for decryption and integrity verification of the small data, and the user plane gateway is responsible for routing and distribution of the small data. Therefore, in the process of transmitting the small data from the access network to the user plane gateway, there is a risk that the small data is tampered with, and security is not high. After completing performing decryption and integrity verification on the small data, the access network device transmits the data through a secure path between the access network device and a core network device, for example, the user plane gateway.

However, because the small data is transmitted through the secure path after being decrypted by the access network device, there is a security risk. For example, the data may be tampered with or stolen before being transmitted to the core network through the secure path. Consequently, security is low. In addition, in some cases, a user plane gateway or another core network element may need to be switched due to reasons such as a network load and a service requirement. This is more unfavorable for secure data transmission.

In view of this, this application provides a method, to implement user plane security protection between UE and a user plane gateway, and improve data transmission security. It should be understood that the method provided in this application is not limited to SDFP transmission or small data transmission. The method provided in the embodiments of this application is applicable to all scenarios in which data is transmitted between the UE and the user plane gateway and the user plane gateway serves as a security termination point for user data transmission. For example, the scenarios include but are not limited to an enhanced mobile broadband (eMBB) service, an ultra-reliable and low-latency communications (URLLC) service, and an IoT service.

For ease of understanding, the following first briefly describes several terms in this application before the embodiments of this application are described.

1. Small data: Small data transmission is mainly applied to a cellular internet of things (CIoT), and may be applied to a terminal with low complexity, limited energy, and a low transmission rate. In some scenarios, a terminal may have low mobility, for example, an internet of things device such as a rangefinder, a water meter, an electricity meter, or a sensor.

2. Authentication and key agreement (AKA): In a power-on process and a registration process, a user may perform an AKA process with a network. Two-way authentication can be implemented between a terminal and the network through the AKA process, so that a key of the terminal is consistent with that of the network. In this way, secure communication between the terminal and the network can be ensured.

3. Intermediate key: The intermediate key is a key that may be used to generate a UPF transmission root key $K_{UPF}$.

In the embodiments of this application, the intermediate key may include a first intermediate key $K_{AMF}$ and a second intermediate key $K_{SMF}$.

The first intermediate key $K_{AMF}$ may be separately obtained by UE and an AMF in a UE registration process. $K_{AMF}$ is related to a key set identifier in 5G (KSI (key set identifier) in 5G, ngKSI). For example, the UE and the AMF each may pre-store a one-to-one correspondence between at least one $K_{AMF}$ and at least one ngKSI. Therefore, each ngKSI may be used to uniquely indicate one $K_{AMF}$. $K_{AMF}$ may be used to subsequently generate the UPF transmission root key $K_{UPF}$.

The second intermediate key $K_{SMF}$ may be a key derived from $K_{AMF}$, for example, may be generated based on $K_{AMF}$ and by using an algorithm such as a key derivation function (KDF), and may be specifically shown in the following formula:

$K_{SMF}$=KDF($K_{AMF}$, another parameter), where the another parameter may also be referred to as an input parameter, and is abbreviated as IP, for example, may include at least one of a session identifier, a slice identifier, a session type, a fresh parameter, and an SMF identifier; and $K_{SMF}$ may also be used to subsequently generate the UPF transmission root key $K_{UPF}$.

4. UPF transmission root key $K_{UPF}$: a root key used for data transmission between UE and a UPF. Specifically, the root key may be used to subsequently generate an encryption key and an integrity protection key, and the encryption key and the integrity protection key may be used for data transmission between the UE and the UPF. $K_{UPF}$ may be generated based on $K_{AMF}$ or $K_{SMF}$. For example, $K_{UPF}$ may be generated based on $K_{AMF}$ (or $K_{SMF}$) and by using an algorithm such as a key derivation function (KDF), and may be specifically shown in the following formula:

$K_{UPF}$=KDF($K_{AMF}$, another parameter), where the another parameter may include, for example, at least one of a UPF identifier, a session identifier (session ID), a network identifier, a character string, and a fresh parameter.

Specific content included in the parameters used to generate the second intermediate key $K_{SMF}$ or the UPF transmission root key $K_{UPF}$ is listed as follows:

For example, the fresh parameter may include but is not limited to: an arbitrary or non-repeated random number (number once, Nonce) that is used only once, a random number, a counter, a NAS message counter (NAS count, which, for example, may include an uplink (UL) NAS count and a downlink (DL) NAS count), a next hop (NH), a timestamp, and a next hop chaining counter (NCC).

For example, the UPF identifier may include but is not limited to an identity (ID) of a UPF, an index of the UPF, a UPF downlink/uplink tunnel identifier (UPF DL/UL tunnel endpoint (TE) ID), and a count value of the UPF. The count value of the UPF may be used to indicate a UPF sequence number.

For example, the SMF identifier may include but is not limited to: an ID of an SMF, an index of the SMF, a MAC address of the SMF, an identifier that is connected to the SMF and that may be used to identify the SMF, and a count value of the SMF. The count value of the SMF may be used to indicate an SMF sequence number. For example, if the SMF is identified as an SMF 1, an SMF 2, or the like, the count value may be 1, 2, 3, or the like. For example, the session identifier may include but is not limited to: a packet data unit (PDU) session ID (PDU session ID), and a service ID or a service type corresponding to a session.

For example, the network identifier may include but is not limited to: an operator identity (for example, a public land mobile network (PLMN) ID), an access network identifier (access network ID), a serving network identifier (serving network ID), a cell identifier (cell ID), a base station identifier (gNB ID), a local area network ID, a slice ID, a bearer ID, a quality of service (QoS) ID, a flow ID, and network slice selection assistance information ( ).

The character string may be a character indicating a scenario to which the key is applicable, for example, may include but is not limited to: "SD", "SDFP", "small data", "CIOT", or the like.

It should be understood that the foregoing listed parameters are merely examples, and should not constitute any limitation on this application. Specific content of the UPF identifier, the session identifier, the network identifier, the character string, and the fresh parameter is not limited in this application. In addition, this application does not exclude a possibility that other information is used as a parameter used to generate a root key.

It should be further understood that names of the intermediate key and the root key listed above are merely for ease of identification, and should not constitute any limitation on this application. This application does not exclude a possibility of replacing the names of the intermediate key or the root key with other names to implement same or similar functions.

5. Security key: In the embodiments of this application, the security key may include an encryption key and an integrity protection key.

The encryption key may be a parameter input by a transmit end when the transmit end encrypts a plaintext based on an encryption algorithm to generate an encrypted text. If a symmetric encryption method is used, the encryption key and a decryption key are the same. A receive end may decrypt the encrypted text based on the same encryption algorithm and encryption key. In other words, the transmit end and the receive end may perform encryption and decryption based on a same key.

In this embodiment, the encryption key may be referred to as $K_{UPFenc}$ for short. The encryption key $K_{UPFenc}$ may be generated based on the UPF transmission root key $K_{UPF}$ and by using a key generation algorithm such as a KDF. Details may be shown in the following formula:

$K_{UPFenc}$=KDF($K_{UPF}$, another parameter), where the another parameter may be a character string, for example, "SD", "SDFP", "Small data", or "CIoT"; or the another parameter may be a type of an encryption algorithm, a length of a type of an encryption algorithm, an identifier of an encryption algorithm, a length of an identifier of an encryption algorithm, or the parameter mentioned above; and for example, $K_{UPFenc}$=KDF($K_{UPF}$, "SD", a type of an encryption algorithm).

The integrity protection key may be a parameter input by the transmit end when the transmit end performs integrity protection on a plaintext or an encrypted text based on an integrity protection algorithm. The receive end may perform, based on the same integrity protection algorithm and integrity protection key, integrity verification on data on which integrity protection is performed.

In this embodiment, the integrity protection key may be referred to as $K_{UPFint}$ for short. The integrity protection key $K_{UPFint}$ may be generated based on the UPF transmission root key $K_{UPF}$ and by using a key generation algorithm such as a KDF. Details may be shown in the following formula:

$K_{UPFint}$=KDF($K_{UPF}$, another parameter), where the another parameter may be a character string, for example, "SD", "SDFP", "Small data", or "CIoT"; or the another parameter may be a type of an integrity protection algorithm, a length of a type of an integrity protection algorithm, an identifier of an integrity protection algorithm, a length of an identifier of an integrity protection algorithm, or the parameter mentioned above; and for example, $K_{UPFint}$=KDF ($K_{UPF}$, "SD", a type of an integrity protection algorithm).

6. Security capability: This capability includes but is not limited to a security algorithm, a security parameter, a key, and the like. In the embodiments of this application, the security capability may include, for example, a security capability of UE and a security capability of a user plane gateway.

7. Security algorithm: The security algorithm is an algorithm used for data security protection. For example, the security algorithm may include an encryption/decryption algorithm and an integrity protection algorithm.

8. Security context: The security context is information that can be used to implement data encryption/decryption and/or integrity protection. For example, the security context may include an encryption/decryption key, an integrity protection key, a fresh parameter (for example, a NAS count), an ngKSI, and a security algorithm.

For example, the security context may include but is not limited to one or more of an intermediate key, a UPF transmission root key, an encryption/decryption key, an integrity protection key, a key lifetime, a key identifier, a key index, a UE security capability, an integrity algorithm, an integrity protection algorithm identifier, an encryption algorithm, and an encryption algorithm identifier, and a count value used to calculate a security key, such as a NAS count, an NH, a timestamp, an NCC, and counters for replay protection.

9. Security termination point: A termination point in the embodiments of this application is a user plane security protection termination point, or is briefly referred to as a user plane security termination point, a security termination point, or the like. In this embodiment, user plane security is established between the UE and the user plane gateway. Therefore, the user plane security protection termination points are the UE and the user plane gateway. As the user plane security protection termination points, the UE and the user plane gateway may be responsible for encryption/decryption and/or integrity protection of data.

10. User plane security protection activation: In this embodiment, the user plane security protection activation includes encryption/decryption protection activation and/or integrity protection/verification activation. To be specific, three cases may exist: Only the encryption/decryption protection activation is included, only the integrity protection/verification activation is included, and both the encryption/decryption protection activation and the integrity protection/verification activation are included. In the following embodiments, "whether to activate encryption protection and/or integrity protection" may include one of the following three cases: whether to activate only the encryption/decryption protection, whether to activate only the integrity protection/verification, or whether to activate both the encryption/decryption protection and the integrity protection/verification.

It may be understood that, in the embodiments of this application, for downlink transmission, the user plane gateway may be an encryption end, and the user plane security protection activation may include encryption protection activation; the UE may be a decryption end, and the user plane security protection activation may include decryption protection activation; the user plane gateway may be an integrity protection end, and the user plane security protection activation may include integrity protection activation; and the UE may be an integrity verification end, and the user plane security protection activation may include integrity verification activation. For uplink transmission, the UE may be an encryption end, and the user plane security protection activation may include encryption protection activation; the user plane gateway may be a decryption end, and the user plane security protection activation may include decryption protection activation; the UE may be an integrity protection end, and the user plane security protection activation may include integrity protection activation; and the user plane gateway may be an integrity verification end, and the user plane security protection activation may include integrity verification activation.

Therefore, in a data transmission process, the UE may serve as both an encryption end and a decryption end, or may serve as both an integrity protection end and an integrity verification end. The user plane gateway may serve as both an encryption end and a decryption end, or may serve as both an integrity protection end and an integrity verification end. If encryption/decryption protection is activated, both the UE and the user plane gateway may activate encryption protection and decryption protection. If integrity protection/verification is activated, both the UE and the user plane gateway may activate integrity protection and integrity verification.

Therefore, in the following descriptions, unless otherwise specified, "activating encryption protection" and "activating encryption/decryption protection" have a same meaning, or in other words, may be replaced with each other; and "activating integrity protection" and "activating integrity protection/verification" have a same meaning, or in other words, may be replaced with each other.

It should be noted that activating user plane security protection may be understood as enabling a security protection function. For example, activating encryption/decryption protection means enabling an encryption/decryption function. On the contrary, not to activate encryption/decryption protection is not to enable the encryption/decryption function. However, it should be understood that not to activate encryption and decryption protection does not mean that no encryption key or decryption key is generated, and does not mean that no encryption algorithm is negotiated. In this embodiment, the user plane security termination point may obtain an encryption/decryption key and an integrity protection key in advance, and may negotiate an encryption/decryption algorithm and an integrity protection algorithm in advance. When it is determined to activate security protection, corresponding security protection may be directly enabled. For example, if encryption/decryption protection is activated, encryption protection may be directly performed based on the encryption algorithm and the encryption key, or data may be directly decrypted based on the decryption algorithm and the decryption key.

11. Security policy: In this embodiment, a plurality of security policies are involved, for example, may include a user plane security policy in subscription information of the UE, a first security policy generated by a session management network element, and a second security policy generated by a user plane gateway. The security policy may be at least used to indicate whether to activate encryption protection and/or integrity protection. In an implementation, the security policy may indicate a preference for security protection, for example, may indicate required, preferred, and not needed security protection. Whether to activate encryption protection and/or integrity protection may be determined based on the preference for security protection.

Optionally, the security policy may further be used to indicate a user plane security termination point or a preference suggestion for a user plane security termination point. Each security policy may further indicate more other information, for example, a strength suggestion of a security algorithm. Specific content of each security policy is described by using an example in the following embodiments. Detailed descriptions of content included in each security policy are omitted herein.

12. Session and service continuity (SSC) mode: To ensure continuity of a session, a user plane gateway switching scenario in a session process may include the following three modes:

an SSC mode 1: the user plane gateway remains unchanged;

an SSC mode 2: a session is interrupted and then established, and the user plane gateway is changed; and an SSC mode 3: a session is established and then interrupted, and the user plane gateway is changed.

In the preceding three modes, the SSC mode 1 does not cause the change of the user plane gateway, and the other two modes cause the change of the user plane gateway. A core network element that may determine whether to switch the user plane gateway may be, for example, an access and mobility management network element or a session management network element. For example, the access and mobility management network element or the session management network element may determine, based on one or more of a current network load, a service type requirement, a local policy, an operator policy, and the like, whether the user plane gateway needs to be switched.

In addition, the session management network element may also change. For example, the access and mobility management network element may determine, based on one or more of a network load, a service type requirement, a local policy, and an operator policy, whether to switch the session management network element. For another example, the session management network element determines, based on one or more of a load of the session management network element, a service type requirement, a local policy, and an operator policy, whether the session management network element needs to be switched, and notifies the access and mobility management network element when the session management network element needs to be switched.

In addition, the access and mobility management network element may also change. For example, the access network device may determine, based on an operator policy and/or a network deployment coverage situation, whether the access and mobility management network element needs to be switched.

In other words, in a user plane gateway switching scenario, any one of the user plane gateway, the session management network element, and the access and mobility management network element may change.

In the embodiments of this application, for ease of differentiation and description, an access and session management network element used for a current PDU session is denoted as a source access and session management network element, and an access and session management network element used for a newly established PDU session is denoted as a target access and session management network element; a session management network element used for the current PDU session is denoted as a source session management network element, and a session management network element used for the newly established PDU session is denoted as a target session management network element; and a user plane gateway used for the current PDU session is denoted as a source user plane gateway, and a user plane gateway used for the newly established PDU session is denoted as a target user plane gateway.

With reference to the accompanying drawings, the following describes in detail a security context obtaining method provided in an embodiment of this application.

It should be noted that, in the following process of describing the embodiments with reference to the accompanying drawings, the figures are merely for ease of understanding, and shall not constitute any limitation on this application. In addition, a RAN shown in the figures may correspond to an access network device, an AMF may correspond to an access and mobility management network element, an SMF may correspond to a session management network element, and a UPF may correspond to a user plane gateway. Names of the network elements are defined only for distinguishing between different functions, and shall not constitute any limitation on this application. This application does not exclude a possibility of defining another network element to implement a same or similar function.

It should be further noted that a network element that may be used to implement the UPF is not limited to the user plane gateway, and may further be, for example, a network element, such as a serving gateway (SGW), a public data network (PDN) gateway (PGW), a PDU session anchor, a session proxy, or a local breakout server (LBO server), that is used to transmit or route user plane data.

The following embodiments are merely examples, and the embodiments of this application are described in detail by using user plane security protection deployed between the UE and the user plane gateway as an example. The user plane gateway may be replaced with a PGW and another network element that may be used to implement a same or similar function.

For ease of understanding the embodiments of this application, a specific process of obtaining a security context only in the user plane gateway switching scenario in a PDU session reestablishment process is first described in detail. Therefore, network elements in this embodiment may include an access and mobility management network element (or referred to as a source access and mobility management network element), a session management network element (or referred to as a source session management network element), a source user plane gateway, and a target user plane gateway.

Figure 3:
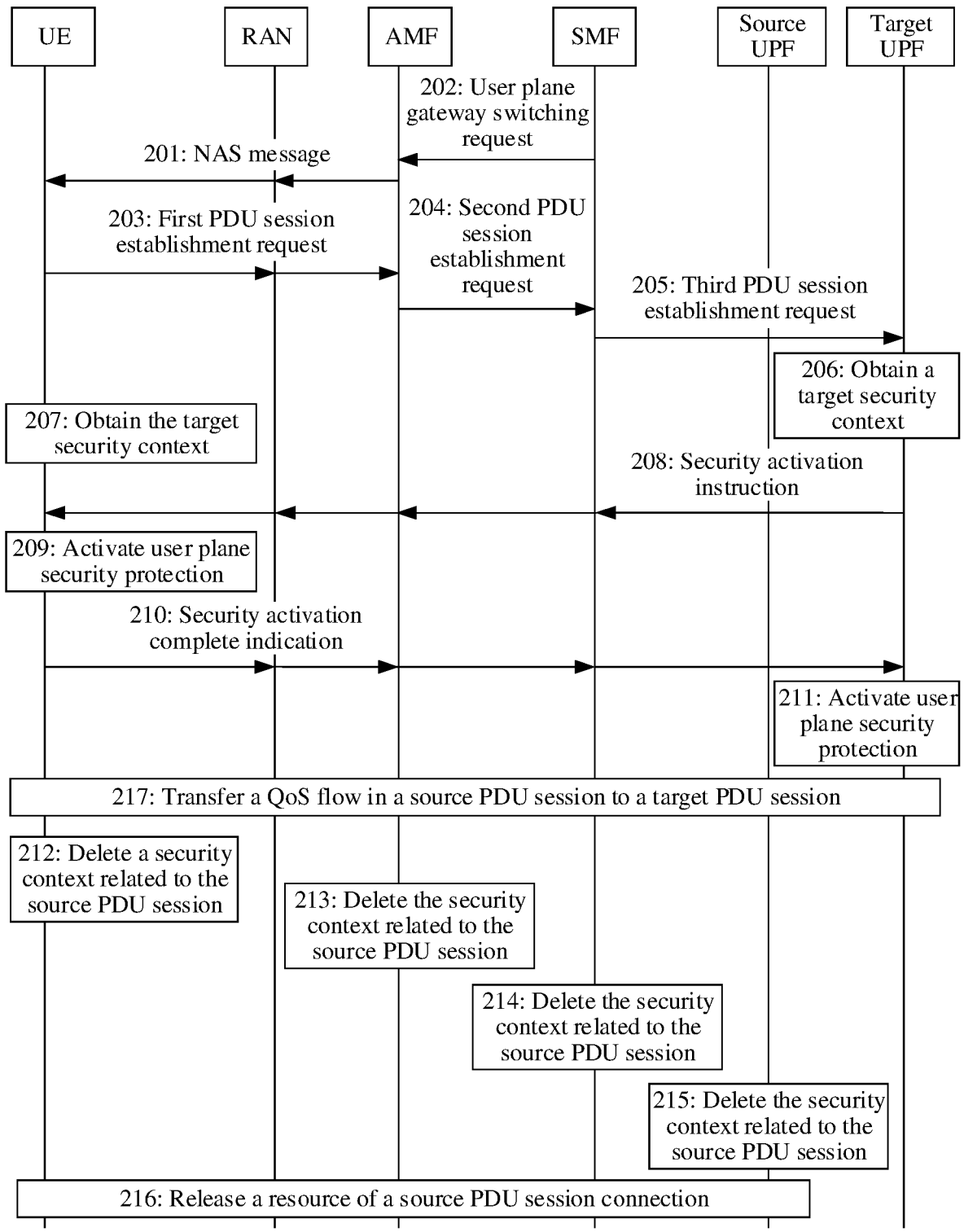
FIG. 3 is a schematic flowchart of a security context obtaining method according to an embodiment of this application.

FIG. 3 is a schematic flowchart of a security context obtaining method 200 from a perspective of device interaction according to an embodiment of this application. As shown in the figure, the method 200 shown in FIG. 3 may include step 201 to step 217. The following describes the steps in the method 200 in detail with reference to FIG. 3.

Step 201: UE receives a NAS message from an access and mobility management network element, where the NAS message is used to indicate that a PDU session needs to be reestablished. Correspondingly, the access and mobility management network element sends the NAS message to the UE.

In an implementation, the NAS message includes a PDU session modification command. The PDU session modification command carries a session identifier (ID) of a source PDU session and a PDU session reestablishment cause. The NAS message may be sent to the UE in a scenario of an SSC mode 3 in which a session is established and then interrupted, and is used to indicate the UE to reestablish a PDU session.

In another implementation, the NAS message includes a PDU session release command. The PDU session release command carries a session identifier of a source PDU session and a PDU session release cause. The NAS message may be sent to the UE in a scenario of an SSC mode 2 in which a session is interrupted and then established, and is used to indicate the UE to reestablish a PDU session.

In this embodiment, for ease of differentiation and description, a PDU session used for current data transmission is referred to as a source PDU session, and an identifier of the source PDU session may be referred to as a source PDU session identifier (PDU Session ID) for short. Correspondingly, a PDU session reestablished by the UE based on the NAS message in the following is referred to as a target PDU session, and an identifier of the target PDU session may be referred to as a target PDU session identifier for short. In brief, the source PDU session may be an old PDU session, and the source PDU session identifier may be an old PDU session identifier; and the target PDU session may be a new PDU session, and the target PDU session identifier may be a new PDU session identifier.

Each PDU session identifier may be used to uniquely indicate a PDU session connection. Therefore, the core network element may indicate, by adding the source PDU session identifier to a user plane gateway switching request, a PDU session connection that needs to be released and a security context used for the source PDU session.

The UE may receive the NAS message from the access and mobility management network element via an access network device; determine, based on the source PDU session identifier carried in the NAS message, that the PDU session indicated by the source PDU session identifier needs to be migrated; and determine, based on the PDU session reestablishment cause or the PDU session release cause, that a target PDU session that may be connected to a same data network (DN) needs to be reestablished. In other words, both the PDU session reestablishment cause and the PDU session release cause may be used to indicate that a target PDU session that may be connected to a same DN needs to be reestablished. For ease of description, the PDU session reestablishment cause and the PDU session release cause are collectively referred to as a PDU session reestablishment cause below.

It should be understood that in a PDU session reestablishment scenario, the PDU session reestablishment cause in the PDU session modification command and the PDU session release cause in the PDU session release command may have a same function. However, this should not constitute any limitation on this application. In another scenario, the PDU session reestablishment cause in the PDU session modification command and the PDU session release cause in the PDU session release command may alternatively be used to indicate different information. This is not limited in this application.

It should be noted that PDU session reestablishment may include one or more of the following: user plane gateway switching, session management network element switching, access and mobility management network element switching, access network device switching, and a change of an IP address corresponding to the session.

If a session management network element determines to initiate user plane gateway switching, the session management network element may send the user plane gateway switching request to the access and mobility management network element, so that the access and mobility management network element sends the NAS message to the access network device. Optionally, before step 201, the method 200 further includes step 202: The access and mobility management network element receives the user plane gateway switching request (reallocation request) from the session management network element, where the user plane gateway switching request carries the source PDU session identifier and the PDU session reestablishment cause. Correspondingly, the session management network element sends the user plane gateway switching request to the access and mobility management network element.

Optionally, the user plane gateway switching request is carried in a communication message (Namf_Communication_N1N2MessageTransfer) between the access and mobility management network element and the session management network element.

Optionally, the session management network element obtains information about a user plane gateway that may serve as a security termination point. The session management network element may determine, based on the information about the user plane gateway that may serve as the security termination point, a target user plane gateway used for a target PDU session.

The session management network element may request, from the access and mobility management network element by using the user plane gateway switching request, the information about the user plane gateway that may serve as the security termination point; or may request, from a unified data management network element or a policy control network element, the information about the user plane gateway that may serve as the security termination point. The session management network element may store configuration information, and the configuration information may include the information about the user plane gateway that may serve as the security termination point. In this case, the session management network element does not need to obtain, from another network element, the information about the user plane gateway that may serve as the security termination point.

In addition, the access network device may further pre-store the configuration information, and the configuration information may include the information about the user plane gateway that may serve as the security termination point. When the PDU session is established between the user plane gateway that may serve as the security termination point and the UE, the access network device may determine that the access network device does not serve as the security termination point.

Optionally, the session management network element may further request to obtain a security capability of the UE from the access and mobility management network element by using the user plane gateway switching request.

The security capability of the UE may include, for example, a name or an identifier of a security algorithm supported by the UE or other information that may be used to indicate the security algorithm. Information about the security capability of the UE may further include, for example, a priority list of security algorithms supported by the UE.

The security capability of the UE may be, for example, a security capability indicated in a message such as a registration request or a session request sent by the UE. The security capability may be sent to the access network device and/or the core network element, for example, the access and mobility management network element. Therefore, the security capability indicated by the UE may be obtained from the UE, or may be obtained from the access and mobility management network element. However, it should be understood that the security capability of the UE is not necessarily indicated only by the UE, and may alternatively be determined in a source PDU session establishment process or a previous PDU session establishment process based on the security capability indicated by the UE and subscription information of the UE obtained from the unified data management network element or the policy control network element. Therefore, the security capability of the UE may be determined based on the security capability indicated by the UE, or may be determined based on the security capability indicated by the UE and the security capability of the UE indicated in the subscription information of the UE. Optionally, the session management network element may further request to obtain a transmission capability of the UE from the access and mobility management network element by using the user plane gateway switching request.

In this embodiment, the transmission capability of the UE may mean that the UE supports fast data transmission between the UE and the user plane gateway and does not need to process excessive signaling interaction. Particularly, when the UE changes from an idle state to a connected state, the UE does not need to process excessive signaling messages. That the UE supports fast data transmission between the UE and the user plane gateway may alternatively be understood as that the access network device and/or the access and mobility management network element may not need to store a context used for data transmission, for example, a security context. As an example instead of a limitation, the data may be common data, small data, or data corresponding to a specific service.

For example, the data may be small data, and the small data may be transmitted based on, for example, a small data fast path (SDFP). The small data fast path transmission may provide a fast path for user plane data transmission between UEs in a context management (CM) idle state in a CIoT, to avoid signaling interaction caused by mode switching between the CM idle state and a CM connected state. In this way, data transmission between the UEs in the CM idle state in the CIoT is optimized. If the access and mobility management network element determines to initiate user plane gateway switching, the access and mobility management network element may directly send the PDU session modification command to the UE via the access network device.

Step 203: The UE sends a first PDU session establishment request to the access and mobility management network element. Correspondingly, the access and mobility management network element receives the first PDU session establishment request from the UE.

In this embodiment, for ease of differentiation and description, the PDU session establishment request sent by the UE to the access and mobility management network element is denoted as the first PDU session establishment request, the following PDU session establishment request sent by the access and mobility management network element to the session management network element is denoted as a second PDU session establishment request. It should be understood that the first PDU session establishment request, the second PDU session establishment request, and the following third PDU session establishment request are all sent for requesting to establish the target PDU session, in other words, the first PDU session establishment request, the second PDU session establishment request and the third PDU session establishment request are examples of a target PDU session establishment request.

Specifically, the UE may determine, based on the NAS message received in step 201, to initiate a session establishment procedure. Therefore, the UE may generate a target PDU session identifier based on the NAS message, and send the target PDU session identifier to the access and mobility management network element by using the first PDU session establishment request. Optionally, the first PDU session establishment request further carries a source PDU session identifier.

It should be noted that when separately receiving the user plane gateway switching request from the session management network element and the first PDU session establishment request from the UE, the access and mobility management network element may determine, based on the source PDU session identifier carried in the user plane gateway switching request and the source PDU session identifier carried in the first PDU session establishment request, whether the first PDU session establishment request is sent by the UE based on the user plane gateway switching request. For example, when the source PDU session identifier carried in the user plane gateway switching request is the same as the source PDU session identifier carried in the first PDU session establishment request, it is considered that the first PDU session establishment request initiated by the UE is sent based on the user plane gateway switching request; and when the source PDU session identifier carried in the user plane gateway switching request is different from the source PDU session identifier carried in the first PDU session establishment request, it is considered that the first PDU session establishment request is not sent by the UE based on the user plane gateway switching request. For example, it may be a PDU session reestablishment procedure initiated for another user plane gateway switching request. This is not limited in this application. In addition, the source PDU session identifier may further be used to determine a source PDU session that needs to be released.

It should be further noted that when receiving a PDU session establishment request, the access and mobility management network element may locally store a mapping relationship between a PDU session identifier and the session management network element based on the selected session management network element and the PDU session identifier added by the UE to the PDU session establishment request. For example, in this embodiment, in the previous procedure of establishing the source PDU session, the access and mobility management network element may record a mapping relationship between the source PDU session identifier and the session management network element, which is, for example, denoted as a first mapping relationship; and when receiving the first PDU session establishment request, the access and mobility management network element may further record a mapping relationship between the target PDU session identifier and the session management network element based on the target PDU session identifier carried in the first PDU session establishment request, which is, for example, denoted as a second mapping relationship. In other words, after the UE initiates the PDU session reestablishment procedure, the access and mobility management network element may update the first mapping relationship to the second mapping relationship based on the target PDU session identifier.

In an implementation, in the PDU session establishment process, the access and mobility management network element may locally store a correspondence between a PDU session identifier and an identifier of a selected session management network element. Optionally, the access and mobility management network element may locally store a correspondence between a PDU session identifier, single network slice selection assistance information (S-NSSAI), and an identifier of a selected session management network element. In a PDU session release process, the access and mobility management network element may delete the locally stored correspondence between the PDU session identifier and the identifier of the selected session management network element, or delete the locally stored correspondence between a PDU session identifier, S-NSSAI, and an identifier of a selected session management network element.

In addition, when successively receiving the user plane gateway switching request from the session management network element and/or the first PDU session establishment request from the UE, the access and mobility management network element may determine, based on the source PDU session identifier, a PDU session connection that needs to be released. The PDU session connection may be understood as a resource used for the PDU session, for example, may include an IP address, a tunnel ID, and the like that are related to the PDU session. This is not limited in this application.

It should be noted that reasons for releasing the source PDU session are not limited to the foregoing description. For example, release of the source PDU session may be triggered because the UE transfers data transmission to a new PDU session, an old PDU session is no longer required, or a session period on a network side (for example, a session management network element) expires. The release of the source PDU session may even be triggered by another network element such as the policy control network element. This is not limited in this application.

Optionally, the first PDU session establishment request further carries an identifier of the UE. For example, the identifier of the UE may include but is not limited to an international mobile equipment identity (IMEI), an international mobile subscriber identification number (IMSI), an IP multimedia subsystem private user identity (IMS (IP multimedia subsystem) private user identity, IMPI), a temporary mobile subscriber identity (TMSI), an IP multimedia public identity (IMPU), a media access control (MAC) address, an IP address, a phone number, a globally unique temporary UE identity (GUTI) (for example, which may be specifically a 5G GUTI for 5G), a subscription permanent identifier (SUPI), a subscriber concealed identifier (SUCI), or a permanent equipment identifier (PEI).

It should be understood that the first PDU session establishment request message may alternatively not carry the identifier of the UE. The access and mobility management network element may alternatively assign a temporary identifier, for example, a GUTI to the UE. Alternatively, a previous registration request message already carries the identifier of the UE, for example, an SUCI, a 5G GUTI, or a PEI.

Optionally, the first PDU session establishment request further carries an indication of a service type. For example, the indication of the service type may be an identifier of the service type or other information that may be used to indicate the service type. A specific form of the indication of the service type is not limited in this application.

Optionally, the first PDU session establishment request further carries security requirement information of a service, and the security requirement information of the service is used to indicate a security requirement of the session service. In this embodiment, the security requirement information of the service may correspond to the service type. For example, the first PDU session establishment request may carry information about a security algorithm required by a service type. It may be understood that different service types may correspond to different security algorithms. For example, a security algorithm required by a uRLLC service may be different from a security algorithm required by an IoT service. For example, the IoT service may require a lightweight security algorithm, and the uRLLC service may require a security algorithm with relatively high security strength.

Step 204: The access and mobility management network element sends the second PDU session establishment request to the session management network element based on the received first PDU session establishment request. Correspondingly, the session management network element receives the second PDU session establishment request from the access and mobility management network element.

After determining that the PDU session needs to be reestablished, the access and mobility management network element may send the second PDU session establishment request to the session management network element, so that the session management network element sends the third PDU session establishment request to the target user plane gateway in step 205. Correspondingly, the target user plane gateway receives the third PDU session establishment request from the session management network element.

After the target user plane gateway receives the third PDU session establishment request, it may be determined that the target user plane gateway needs to serve as a user plane security termination point. Therefore, the user plane gateway may obtain a target security context in step 206.

In this embodiment, for ease of differentiation and description, a security context used for the source PDU session is denoted as a source security context, and a security context used for the target PDU session is denoted as a target security context. In brief, the source security context may be used to protect data transmission between the UE and a source user plane gateway, and the target security context may be used to protect data transmission between the UE and the target user plane gateway.

Specifically, the security context may specifically include but is not limited to a security algorithm, a security key, and a security policy. For example, the source security context may include but is not limited to a source security algorithm, a source security key, and a source security policy. The target security context may include but is not limited to a target security algorithm, a target security key, and a target security policy. The target security algorithm may be determined based on the security capability of the UE and a security capability of the target user plane gateway. The target security key may be generated based on one or more of the source security context, the target PDU session, and the target security algorithm. The target security policy may be determined based on the source security policy. It should be understood that a manner of determining the source security context is not limited in this application.

The source security algorithm and the source security key that are listed above may be generated or determined by the session management network element, or may be obtained by the session management network element from another network element such as the access and mobility management network element or the target user plane gateway. This is not limited in this application. The source security policy described above may be determined by the source user plane gateway based on the source user plane security policy, for example, determined with reference to a capability of the source user plane gateway. A manner of determining the source security policy is not limited in this application.

The following describes in detail a process of generating and distributing the target security context.

1. Target Security Algorithm

The target security algorithm may be determined based on the security capability of the UE and the security capability of the target user plane gateway. In this embodiment, the target security algorithm may be determined by the access and mobility management network element, the session management network element, or the target user plane gateway. This is not limited in this application.

The following separately describes specific implementations of determining the target security algorithm by the foregoing different network elements.

Implementation 1: The access and mobility management network element determines the target security algorithm.

Because the access and mobility management network element pre-records the security capability of the UE, the access and mobility management network element may not need to obtain the security capability of the UE by using additional signaling.

The security capability of the target user plane gateway may be obtained by the access and mobility management network element in advance. Specifically, after determining the target user plane gateway, the session management network element may request to obtain the security capability of the target user plane gateway from the target user plane gateway or the unified data management network element. Alternatively, after determining the target user plane gateway, the session management network element may indicate the target user plane gateway to the access and mobility management network element. For example, a user plane switching request carries indication information of the target user plane gateway, so that the access and mobility management network element obtains the security capability of the target user plane gateway from the unified data management network element. Alternatively, the security capability of the target user plane gateway may be pre-configured and stored in the access and mobility management network element. This is not limited in this application.

The access and mobility management network element may determine the target security algorithm based on the security capability of the UE and the security capability of the target user plane gateway.

Further, the access and mobility management network element may further determine the target security algorithm with reference to the service type or the security requirement information of the service. The service type corresponds to the security requirement information of the service, and the security requirement information of the service may be used to indicate information such as security algorithms corresponding to the service type. The access and mobility management network element may determine, based on the security requirement information that is of the service and that is carried in the received first PDU session establishment request, the security algorithms corresponding to the service type, to further determine the target security algorithm. In this case, the target security algorithm may be determined based on the security capability of the UE, the security capability of the target user plane gateway, and the security requirement information of the service. Therefore, the target security algorithm may be an intersection set of security algorithms supported by the UE, security algorithms supported by the user plane gateway, and the security algorithms corresponding to the service type.

In some cases, the user plane gateway (including the target user plane gateway) can support all security algorithms. In this case, the access and mobility management network element may directly determine the target security algorithm based on the security capability of the UE, or the security capability of the UE and the security requirement information of the service.

After determining the target security algorithm, the access and mobility management network element may indicate the target security algorithm to the target user plane gateway via the session management network element. The indication of the target security algorithm may be, for example, a name or an identifier of the target security algorithm or other information that may be used to indicate the target security algorithm. This is not limited in this application.

Optionally, the access and mobility management network element may add the indication of the target security algorithm to the second PDU session establishment request. Optionally, the session management network element may add the indication of the target security algorithm to the third PDU session establishment request.

Implementation 2: The session management network element determines the target security algorithm.

The security capability of the UE may be obtained based on the source PDU session. For example, the security capability of the UE may be recorded and stored in the access and mobility management network element, and the session management network element may request to obtain the security capability of the UE from the access and mobility management network element in step 202. For another example, the security capability of the UE may be recorded and stored in the session management network element, and the session management network element may directly obtain the security capability of the UE locally based on the second PDU session establishment request. For still another example, the security capability of the UE may be recorded and stored in the source user plane gateway, and the session management network element may obtain the security capability of the UE from the source user plane gateway by using, for example, an N4 interface message. A specific manner of obtaining the security capability of the UE by the session management network element is not limited in this application.

After determining the target user plane gateway, the session management network element may obtain the security capability of the target user plane gateway from the target user plane gateway or the unified data management network element. The session management network element may determine the target security algorithm based on the security capability of the UE and the security capability of the target user plane gateway.

Further, the session management network element may further determine the target security algorithm with reference to the service type or the security requirement information of the service. The specific process of determining the target security algorithm with reference to the service type or the security requirement information of the service is described in detail in case 1. For brevity, details are not described herein again.

In some cases, the user plane gateway (including the target user plane gateway) can support all security algorithms. In this case, the session management network element may directly determine the target security algorithm based on the security capability of the UE, or the security capability of the UE and the security requirement information of the service.

After determining the target security algorithm, the session management network element may indicate the target security algorithm to the target user plane gateway. The indication of the target security algorithm may be, for example, a name or an identifier of the target security algorithm or other information that may be used to indicate the target security algorithm. This is not limited in this application.

Optionally, the session management network element may add the indication of the target security algorithm to the third PDU session establishment request.

Implementation 3: The target user plane gateway determines the target security algorithm.

The session management network element may send the security capability of the UE to the target user plane gateway, so that the target user plane gateway determines the target security algorithm based on the security capability of the UE and the security capability of the target user plane gateway.

Further, the target user plane gateway may further determine the target security algorithm with reference to the service type or the security requirement information of the service. In this case, the target user plane gateway may obtain the indication of the service type or the security requirement information of the service from the access and management network element, the session management network element, and the like in advance. The specific process of determining the target security algorithm with reference to the service type or the security requirement information of the service is described in detail in case 1. For brevity, details are not described herein again.

Based on the possible implementations listed above, the target user plane gateway may determine the target security algorithm. However, it should be understood that a specific manner of determining the target security algorithm by the target user plane gateway is not limited to the foregoing listed manners. The specific manner of determining the target security algorithm by the target user plane gateway is not limited in this application.

2. Target Security Key

The target security key may include an encryption key and an integrity protection key. In this embodiment, the target security key may be generated by any one of the access and mobility management network element, the session management network element, and the target user plane gateway. The following separately describes specific implementations of generating the target security key by the foregoing different network elements.

Implementation A: The access and mobility management network element generates the target security key.

The access and mobility management network element may pre-generate a UPF transmission root key; or may generate a UPF transmission root key based on the first PDU session establishment request, and may generate the target security key based on the UPF transmission root key. The UPF transmission root key may be generated based on a first intermediate key and by using a KDF algorithm, and may be specifically shown in the following formula:

$K_{UPF}$=KDF($K_{AMF}$, another parameter), where the another parameter may include, for example, at least one of information about the target user plane gateway, the target PDU session identifier, a network identifier, a character string, and a fresh parameter.

Optionally, the UPF transmission root key may be determined by using the following formula: $K_{UPF}$=KDF($K_{AMF}$, "CIOT", fresh parameter), $K_{UPF}$=KDF($K_{AMF}$, "CIOT", fresh parameter, count value), or $K_{UPF}$=KDF($K_{AMF}$, "CIOT", information about the target user plane gateway, fresh parameter).

For example, the information about the target user plane gateway may include but is not limited to: an identifier of the target user plane gateway, an index of the target user plane gateway, a downlink/uplink tunnel identifier of the target user plane gateway, or a count value of the user plane gateway. The count value of the user plane gateway may be used to indicate a sequence number of the user plane gateway. The access and mobility management network element may obtain one or more of the foregoing listed information about the target user plane gateway via the session management network element or the unified data management network element.

The access and mobility management network element may obtain a target session identifier based on the received first PDU session establishment request. Content included in the network identifier, the character string, and the fresh parameter is listed above one by one. For brevity, details are not described herein again.

A specific method for generating the target security key based on the UPF transmission root key is described in detail above. For brevity, details are not described herein again.

After generating the target security key, the access and mobility management network element may send the target security key to the target user plane gateway via the session management network element.

Implementation B: The session management network element generates the target security key.

Optionally, the access and mobility management network element may generate a UPF transmission root key based on the method described in the implementation 1, and send the UPF transmission root key to the session management network element. The session management network element may generate the target security key based on the UPF transmission root key.

Optionally, the access and mobility management network element may send, to the session management network element, a key identifier, such as a key set identifier (KSI), corresponding to the UPF transmission root key.

Because the UPF transmission root key may change, the access and mobility management network element may derive another parameter KSI in a process of generating the UPF transmission root key. The KSI has a one-to-one correspondence with the UPF transmission root key. If the session management network element can learn of the KSI, the session management network element can learn of the UPF transmission root key.

Optionally, the access and mobility management network element may send an intermediate key (for example, the first intermediate key or a second intermediate key) and an input parameter to the session management network element. The session management network element may generate the UPF transmission root key based on the received intermediate key and the received input parameter, to further generate the target security key. A specific method for generating the UPF transmission root key by the session management network element is the same as the method described in the implementation 1. For brevity, details are not described herein again.

Optionally, the access and mobility management network element may send, to the session management network element, a key identifier, such as a key set identifier in 5G (KSI in 5G, ngKSI), corresponding to the first intermediate key.

Because the first intermediate key may change, the UPF transmission root key may be generated based on the first intermediate key. Therefore, when the first intermediate key changes, the UPF transmission root key also changes accordingly. As described above, the ngKSI and the first intermediate key may have a one-to-one correspondence. The UPF transmission root key is generated based on the first intermediate key, and the first intermediate key has a one-to-one correspondence with the ngKSI. Therefore, if the ngKSI can be learned of, the first intermediate key can be learned of, and the UPF transmission root key can be determined through calculation.

The session management network element may send the generated target security key to the target user plane gateway.

Implementation C: The target user plane gateway generates the target security key.

Optionally, the access and mobility management network element may generate a UPF transmission root key based on the method described in the implementation 1, and send the UPF transmission root key to the target user plane gateway via the session management network element. The target user plane gateway may generate the target security key based on the UPF transmission root key.

Optionally, the access and mobility management network element may send, to the target user plane gateway via the session management network element, a key identifier, such as a KSI, corresponding to the UPF transmission root key.

Optionally, the access and mobility management network element may send an intermediate key (for example, the first intermediate key or a second intermediate key) and an input parameter to the target user plane gateway via the session management network element. The target user plane gateway may generate the UPF transmission root key based on the received intermediate key and the received input parameter, to further generate the target security key. A specific method for generating the UPF transmission root key by the target user plane gateway is the same as the method described in the implementation 1. For brevity, details are not described herein again.

Optionally, the access and mobility management network element may send, to the target user plane gateway via the session management network element, a key identifier, such as an ngKSI, corresponding to the first intermediate key.

Implementation D: The access and mobility management network element pre-generates a plurality of security keys.

In a possible design, the access and mobility management network element may pre-generate a plurality of security keys, and the plurality of security keys have a one-to-one correspondence with a plurality of indexes. After generating the plurality of security keys, the access and mobility management network element may notify the UE of corresponding indexes and an input parameter that is used to generate the plurality of security keys, for example, send the corresponding indexes and the input parameter to the UE by using a radio resource control (RRC) message, so that the UE generates the plurality of same security keys based on the received input parameter, and records the one-to-one correspondence between the plurality of security keys and the plurality of indexes based on an index corresponding to an input parameter of each security key.

When receiving the first PDU session establishment request, the access and mobility management network element may select one of the plurality of security keys as the target security key. The access and mobility management network element may send the target security key to the target user plane gateway via the session management network element. In addition, the access and mobility management network element may notify the UE of an index of the target security key, so that the target security key used by the UE is consistent with the target security key used by the target user plane gateway.

In another possible design, the access and mobility management network element may pre-generate a plurality of UPF transmission root keys, and the plurality of UPF transmission root keys may have a one-to-one correspondence with a plurality of indexes. Optionally, the index of the UPF transmission root key is a KSI or an ngKSI. After generating the plurality of UPF transmission root keys, the access and mobility management network element may notify the UE of corresponding indexes and an input parameter that is used to generate the plurality of UPF transmission root keys, so that the UE generates the plurality of same UPF transmission root keys based on the same input parameter, and records a one-to-one correspondence between the plurality of UPF transmission root keys and the plurality of indexes based on an index of each UPF transmission root key.

When receiving the first PDU session establishment request, the access and mobility management network element may select one of the plurality of UPF transmission root keys as the UPF transmission root key used to generate the target security key. The access and mobility management network element may generate the target security key based on the UPF transmission root key, and send the target security key to the target user plane gateway via the session management network element. In addition, the access and mobility management network element may notify the UE of the index of the UPF transmission root key used to generate the target security key, so that the target security key generated by the UE is consistent with the target security key used by the target user plane gateway.

Implementation E: The session management network element pre-generates a plurality of security keys.

In a possible design, the access and mobility management network element may predetermine an intermediate key and an input parameter that are used to generate the plurality of security keys, and corresponding indexes. The access and mobility management network element may send the intermediate key and the input parameter of the plurality of security keys and the corresponding indexes to the session management network element, and may send the input parameter used to generate the plurality of security keys and the corresponding indexes to the UE, so that the session management network element and the UE generate the plurality of same security keys based on the same intermediate key and the same input parameter, and record the one-to-one correspondence between the plurality of security keys and the plurality of indexes.

When receiving the second PDU session establishment request, the session management network element may select one of the plurality of security keys as the target security key. The session management network element may send the target security key to the target user plane gateway. In addition, the session management network element may send the index of the target security key to the UE, so that the target security key used by the UE is consistent with the target security key used by the target user plane gateway.

In another possible design, the access and mobility management network element may predetermine an intermediate key and an input parameter that are used to generate the plurality of UPF transmission root keys, and corresponding indexes. The access and mobility management network element may send the intermediate key and the input parameter of the plurality of UPF transmission root keys and the corresponding indexes to the session management network element, and may send the input parameter used to generate the plurality of UPF transmission root keys and the corresponding indexes to the UE, so that the session management network element and the UE generate the plurality of same UPF transmission root keys based on the same intermediate key and the same input parameter, and record the one-to-one correspondence between the plurality of UPF transmission root keys and the plurality of indexes.

Optionally, the index of the UPF transmission root key is a KSI or an ngKSI.

When receiving the second PDU session establishment request, the session management network element may select one of the plurality of UPF transmission root keys as the UPF transmission root key used to generate the target security key, and generate the target security key. The session management network element may send the target security key to the target user plane gateway. In addition, the session management network element may send the index of the UPF transmission root key used to generate the target security key to the UE, so that the target security key generated by the UE is consistent with the target security key used by the target user plane gateway. It should be understood that the foregoing lists several implementations for generating the target security key. However, this should not constitute any limitation on this application. A specific method for generating the target security key is not limited in this application. For example, in the implementation D, the access and mobility management network element may alternatively directly send the UPF transmission root key used to generate the target security key to the session management network element or the target user plane gateway after determining the UPF transmission root key, and the session management network element or the target user plane gateway generates the target security key. For another example, in the implementation E, the session management network element may alternatively directly send the UPF transmission root key used to generate the target security key to the target user plane gateway after determining the UPF transmission root key, and the target user plane gateway generates the target security key.

3. Target Security Policy

For ease of understanding, a source user plane security policy, a source security policy, a target user plane security policy, and the target security policy are first briefly described herein.

The source user plane security policy may be determined by the session management network element based on at least one of a user plane security policy obtained based on subscription information of the UE and a local configuration of the source session management network element.

The source security policy may be a security policy that is determined by the source user plane gateway based on the source user plane security policy and the security capability of the source user plane gateway and that is sent to the UE.

The target user plane security policy may be determined by the source user plane security policy. When the session management network element remains unchanged, the source user plane security policy may serve as the target user plane security policy, or the target user plane security policy may be determined based on one or more of the source user plane security policy, a user plane security policy corresponding to a service of a target PDU session, and a user plane security policy required by an operator policy on a target side. When the session management network element changes, the target user plane security policy may be determined based on at least one of the source user plane security policy and a local configuration of a target session management network element, or may be determined based on one or more of the source user plane security policy, the user plane security policy corresponding to the service of the target PDU session, the user plane security policy required by the operator policy on the target side, and the local configuration of the target session management network element. Optionally, the user plane security policy corresponding to the service of the target PDU session may be carried based on the first PDU session establishment request sent by the UE. Optionally, the user plane security policy required by the operator policy on the target side may be obtained from the unified data management network element or a policy control network element.

The target security policy may be a security policy that is determined by the target user plane gateway based on the target user plane security policy and a security capability of the target user plane gateway and that is sent to the UE.

In a process of establishing the source PDU session, the session management network element has obtained the source user plane security policy. For example, the session management network element may obtain the user plane security policy in the subscription information of the UE from the unified data management network element or the policy control network element, and use the user plane security policy in the subscription information of the UE as the source user plane security policy. Alternatively, the session management network element may be preconfigured with the user plane security policy, and use the preconfigured user plane security policy as the source user plane security policy. Alternatively, the session management network element may determine the source user plane security policy based on the user plane security policy obtained in the subscription information of the UE and the preconfigured user plane security policy. A specific method for obtaining the source user plane security policy by the session management network element is not limited in this application.

In this embodiment, because the session management network element remains unchanged, the target user plane security policy may be determined based on one or more of the source user plane security policy, the user plane security policy corresponding to the service of the target PDU session, and the user plane security policy required by the operator policy on the target side. The session management network element may send the target user plane security policy to the target user plane gateway. Optionally, the session management network element may add the target user plane security policy to the third PDU session establishment request.

The target user plane gateway may further determine the target security policy based on the received target user plane security policy. The target security policy is a policy used for user plane security protection between the UE and the target user plane gateway, and may be used to indicate security protection that needs to be activated, for example, encryption protection and/or integrity protection.

Specifically, the target user plane gateway may determine, based on the security protection that needs to be activated and that is indicated in the target user plane security policy and with reference to a capability of the target user plane gateway, the security protection that needs to be activated. For example, when the target user plane security policy indicates to activate the encryption protection and the integrity protection, the target user plane gateway may determine, based on the capability of the target user plane gateway, whether both the encryption protection and the integrity protection can be activated. When a capability of the UE is insufficient, the UE may choose to active one type of protection, for example, activate the encryption protection or the integrity protection. For another example, when the target user plane security policy indicates to activate the encryption protection or the integrity protection and the capability of the user plane gateway is relatively strong, the target user plane gateway may determine, based on the capability of the target user plane gateway, that both the encryption protection and the integrity protection can be activated.

Therefore, specific content indicated in the target user plane security policy may be the same as or different from specific content indicated in the target security policy.

With reference to different implementations, the foregoing describes in detail a specific process of obtaining the target security context by the target user plane gateway. Based on the foregoing method, the target user plane gateway may obtain a new security context based on a new PDU session, to protect the new PDU session by using the new security context. Therefore, a security level is relatively high.

It should be understood that the specific methods for obtaining the target security context by the target user plane gateway that are listed above are merely examples, and should not constitute any limitation on this application. A specific method for obtaining the target security context by the target user plane gateway is not limited in this application. The following further provides a method for obtaining the target security context by the target user plane gateway.

The UE and a core network element (for example, the access and mobility management network element, the session management network element, or the source user plane gateway) may pre-generate the security context. The security context may correspond to the UE, or may be generated based on UE granularity. Different user plane gateways may share a same security context. In other words, when the UE remains unchanged, all network elements may share a same security context. In this case, a source security context may be directly used as the target security context.

Compared with the several methods for obtaining the target security context that are listed above, the method for sharing a security context is more convenient, and a security context does not need to be regenerated based on each time of PDU session establishment.

Step 207: The UE obtains the target security context.

As described above, the target security context may specifically include the target security algorithm, the target security key, and the target security policy. The following describes in detail a specific process of obtaining the target security context by the UE.

1. Target Security Algorithm

As described above, the target security algorithm may be determined by any core network element in the access and mobility management network element, the session management network element, and the target user plane gateway. After determining the target security algorithm, the core network element described above may send indication information of the target security algorithm to the UE, so that the UE performs user plane security protection by using the same target security algorithm.

2. Target Security Key

A specific manner of obtaining the target security key by the UE is related to an implementation of obtaining the target security key by the network side.

If the target user plane gateway obtains the target security key in any one of the implementations A to C listed above, the access and mobility management network element may determine the input parameter used to generate the UPF transmission root key, and send the input parameter to the UE. The UE may generate the UPF transmission root key by using the KDF algorithm and based on the pre-obtained first intermediate key and the received input parameter, to further generate the target security key.

If the target user plane gateway obtains the target security key based on the implementation D or E listed above, the access and mobility management network element may send, to the UE, a predetermined input parameter used to generate a plurality of security keys and an index of each security key. The UE may generate the plurality of security keys based on a pre-obtained intermediate key and the input parameter. Then, the access and mobility management network element or the session management network element may send the index of the target security key to the UE, so that the UE determines the target security key from the plurality of security keys.

3. Target Security Policy

As described above, the target security policy may be determined by the target user plane gateway based on the target user plane security policy. After determining the target security policy, the target user plane gateway may send the target security policy to the UE.

Optionally, the UE uses the shared security context as the target security context. In this case, the UE may not need to generate a new security context based on each time of PDU session establishment.

Step 208: The target user plane gateway sends a security activation instruction to the UE.

After obtaining the target security context, the target user plane gateway may send the security activation instruction to the UE, to instruct the UE to activate user plane security protection. Optionally, the target user plane gateway may send the target security policy to the UE when sending the security activation instruction. If the target security algorithm is determined by the target user plane gateway, the target user plane gateway may optionally send an indication of the target security algorithm to the UE when sending the security activation instruction.

The target user plane gateway may forward the security activation instruction to the UE via the session management network element, the access and mobility management network element, and the access network device. If the UE generates the target security key based on the intermediate key and the input parameter that are sent by the access and mobility management network element, when the security activation instruction is forwarded to the access and mobility management network element, the access and mobility management network element may send the intermediate key and the input parameter that are used to generate the target security key to the UE together with the security activation instruction. If the UE determines the target security key based on an index sent by the access and mobility management network element, when the security activation instruction is forwarded to the access and mobility management network element, the access and mobility management network element may send the index to the UE together with the security activation instruction. If the UE determines the target security key based on an index sent by the session management network element, when the security activation instruction is forwarded to the session management network element, the session management network element may send the index to the UE together with the security activation instruction.

For ease of description, one or more of the intermediate key, the input parameter, and the index that are used to determine the target security key are collectively referred to as information used to determine the target security key below.

Then, the access network device may generate an RRC message based on the received security activation instruction, and send the RRC message to the UE. In other words, the RRC message carries the security activation instruction. The RRC message may be, for example, an RRC reconfiguration message.

Optionally, the RRC message further carries one or more of the following: the target security policy, the indication of the target security algorithm, and the information used to determine the target security key. That is, step 207 and step 208 may be combined into one step for execution. Certainly, step 207 and step 208 may alternatively be performed as different steps. For example, the UE may obtain the target security context in advance. This is not limited in this application.

Step 209: The UE activates user plane security protection according to the security activation instruction.

The UE may activate user plane security protection on a UE side according to the security activation instruction received in step 208 and based on the target security context obtained in step 207.

Optionally, the method 200 further includes step 210: The UE sends a security activation complete indication to the target user plane gateway, to notify the target user plane gateway that the UE has activated user plane security protection. Correspondingly, in step 210, the target user plane gateway receives the security activation complete indication from the UE.

Optionally, the security activation complete indication is carried in an RRC response message. The RRC response message may be, for example, an RRC reconfiguration response message. The access network device may send the security activation complete indication to the target user plane gateway via the access and mobility management network element and the session management network element.

Step 211: The target user plane gateway activates user plane security protection.

The target user plane gateway may activate user plane security protection on a target user plane gateway side based on the security activation complete indication received in step 210. Alternatively, the target user plane gateway may directly activate user plane security protection after obtaining the target security context in step 206. A sequence of performing step 211 and step 210 is not limited in this application.

Based on the foregoing steps, both the UE and the target user plane gateway have activated user plane security protection. In other words, the target PDU session establishment procedure is completed. Secure data transmission may be performed between the UE and the target user plane gateway based on a newly established target PDU session.

Optionally, the method 200 further includes step 212: The UE deletes a security context related to the source PDU session.

The security context related to the source PDU session may be information used to protect the source PDU session, for example, may include but is not limited to a source security algorithm, the source user plane security policy, a source security key, a key identifier, and a count value used to calculate the source security key, for example, a NAS count or an NCC.

Optionally, the method 200 further includes step 213: The access and mobility management network element deletes the security context related to the source PDU session.

Optionally, the method 200 further includes step 214: The session management network element deletes the security context related to the source PDU session.

Optionally, the method 200 further includes step 215: The source user plane gateway deletes the security context related to the source PDU session.

It should be understood that step 212 to step 215 do not necessarily need to be performed at the same time. The UE and the core network element may determine, by themselves after a target PDU session establishment procedure is completed, an occasion for deleting the security context related to the source PDU session. An occasion at which each network element deletes the security context related to the source PDU session is not limited in this application.

Optionally, the method 200 further includes step 216: The access and mobility management network element releases a resource of a source PDU session connection.

Optionally, before step 212, the method 200 further includes step 217: The UE transfers a quality of service (QoS) flow in the source PDU session to the target PDU session.

It should be understood that specific processes of step 212 to step 217 may be the same as those in the prior art. For brevity, detailed descriptions of the specific processes are omitted herein.

It should be further understood that step 212 to step 217 may be performed after step 211, or may be performed after step 201, for example, performed before step 203. If step 212 to step 217 are performed after step 211, that is, the target PDU session is established before the source PDU session is released, this procedure may correspond to the SSC mode 3. If step 212 to step 217 are performed after step 201, that is, the source PDU session is released before the target PDU session is established, this procedure may correspond to the SSC mode 2.

Based on the foregoing method, the UE and a network side complete user plane gateway switching and PDU session reestablishment. The UE and the network side complete user plane gateway switching, session management network element switching, and PDU session reestablishment. Based on a newly established PDU session, secure data transmission may be performed between the UE and a new user plane gateway based on a new security context, thereby implementing end-to-end security protection between the UE and the user plane gateway. During user plane gateway switching, because the security context related to the old PDU session is deleted, security context information related to the old PDU session can be prevented from being obtained by a third party. Therefore, security is higher.

However, in the PDU session reestablishment process, not only the user plane gateway is switched, but also the session management network element and/or the access and mobility management network element may be switched. Processes of reestablishing the PDU session and obtaining the security context when the session management network element and the access and mobility management network element are switched are described in detail below with reference to the accompanying drawings.

Figure 4:
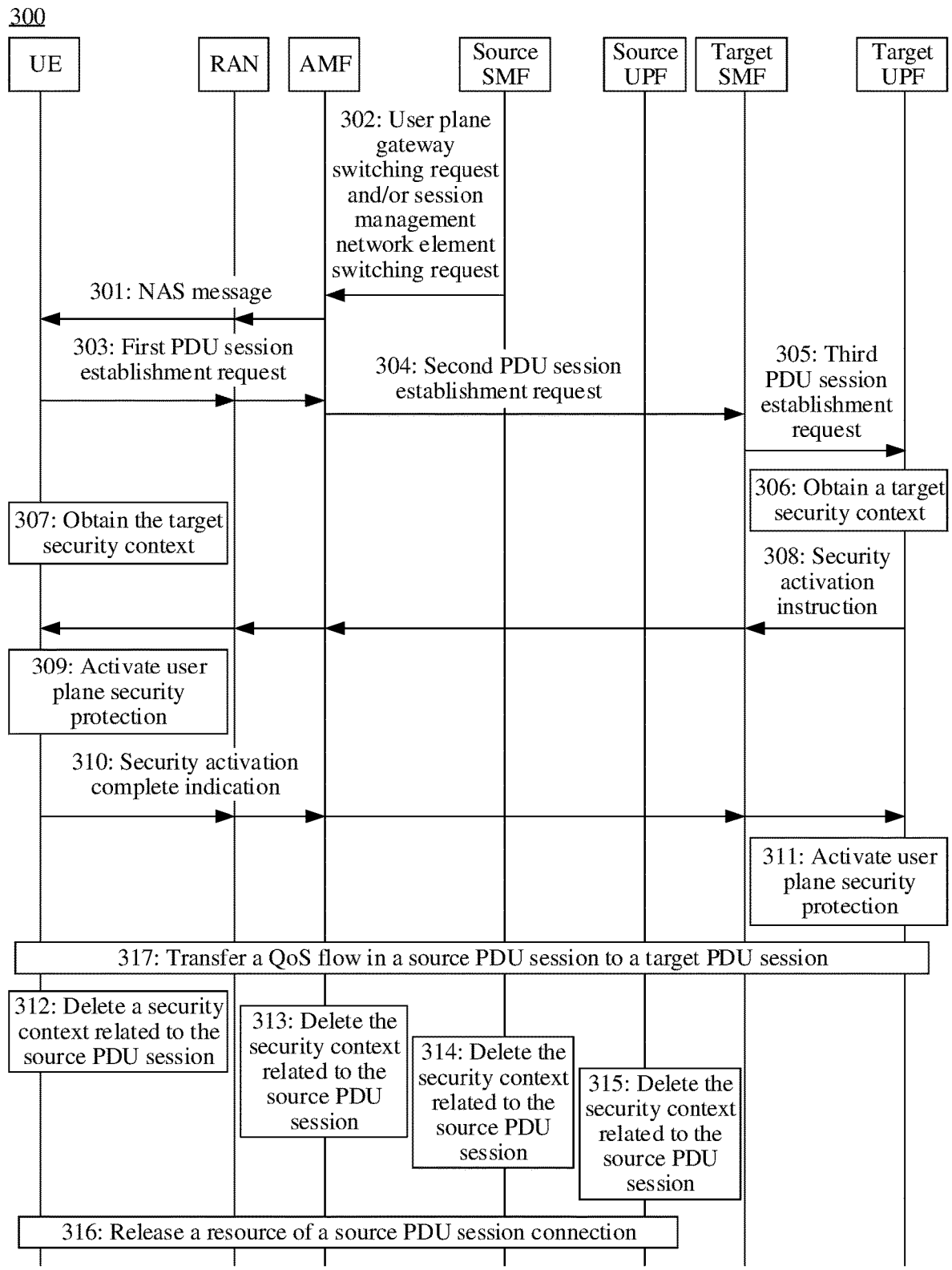
FIG. 4 is a schematic flowchart of a security context obtaining method according to another embodiment of this application.

FIG. 4 is a schematic flowchart of a security context obtaining method 300 from a perspective of device interaction according to another embodiment of this application. As shown in the figure, the method 300 may include step 301 to step 317.

It should be noted that, in a PDU session reestablishment process described in the method 300, a session management network element and a user plane gateway change. Therefore, core network elements in this embodiment may include may include an access and mobility management network element, a source session management network element, a target session management network element, a source user plane gateway, and a target user plane gateway. However, it should be understood that this should not constitute any limitation on this application. When the session management network element changes, the user plane gateway may change or may not change. This is not limited in this application. When the user plane gateway does not change, the source user plane gateway and the target user plane gateway in this embodiment are a same user plane gateway.

The following describes the steps in the method 300 in detail with reference to FIG. 4.

Step 301: UE receives a NAS message from the access and mobility management network element, where the NAS message is used to indicate that a PDU session needs to be reestablished. Correspondingly, the access and mobility management network element sends the NAS message to the UE.

A specific process of step 301 is the same as that of step 201. Because step 201 is described in detail in the foregoing method 200. For brevity, details are not described herein again.

As described above, user plane gateway switching and session management network element switching may be determined by the source session management network element, or may be determined by the access and mobility management network element. If the source session management network element determines to switch the user plane gateway and/or the session management network element, optionally, before step 301, the method further includes step 302: The access and mobility management network element receives a switching request from the source session management network element, where the switching request carries a source PDU session identifier and a PDU session reestablishment cause. Correspondingly, the source session management network element sends the switching request to the access and mobility management network element.

Optionally, the switching request carries an indication of the target session management network element and/or an indication of the target user plane gateway. In other words, the switching request may be used to request to switch the user plane gateway and/or the session management network element. The switching request may be a user plane gateway switching request and/or a session management network element switching request.

The indication of the target session management network element may be, for example, an identifier of the target session management network element or other information that may be used to indicate the target session management network element. The indication of the target user plane gateway may be, for example, an identifier of the target user plane gateway or other information that may be used to indicate the target user plane gateway. Specific forms of the indication of the target session management network element and the indication of the target user plane gateway are not limited in this application.

Because session management network element switching and user plane gateway switching may alternatively be determined by the access and mobility management network element. Therefore, the source session management network element may request, by using the switching request, to switch one or more of the session management network element and the user plane gateway. Certainly, the access and mobility management network element instead of the source session management network element may determine whether the session management network element and the user plane gateway need to be switched. In this case, the access and mobility management network element may further determine the target session management network element and the target user plane gateway. This is not limited in this application.

Step 303: The UE sends a first PDU session establishment request to the access and mobility management network element. Correspondingly, the access and mobility management network element receives the first PDU session establishment request from the UE.

A specific process of step 303 is the same as that of step 203. Because step 203 is described in detail in the foregoing method 200. For brevity, details are not described herein again.

Step 304: The access and mobility management network element sends a second PDU session establishment request to the target session management network element based on the first PDU session establishment request. Correspondingly, the target session management network element receives the second PDU session establishment request from the access and mobility management network element.

In this embodiment, the access and mobility management network element may send the second PDU session establishment request to the target session management network element based on a decision of the access and mobility management network element or the source session management network element switching request. If the target user plane gateway is determined by the access and mobility management network element, optionally, the second PDU session establishment request carries the indication of the target user plane gateway.

Step 305: The target user plane gateway receives a third PDU session establishment request from the target session management network element. Correspondingly, the target session management network element sends the third PDU session establishment request to the target user plane gateway.

The target session management network element may send the third PDU session establishment request to the target user plane gateway based on a decision of the target session management network element or the indication of the target user plane gateway carried in the second PDU session establishment request sent by the access and mobility management network element. After the target user plane gateway receives the third PDU session establishment request, it may be determined that the target user plane gateway needs to serve as a user plane security termination point. Therefore, the target user plane gateway obtains a target security context in step 306.

The following describes in detail a process of obtaining the target security context by the target user plane gateway.

1. Target Security Algorithm

The target security algorithm may be determined based on a security capability of the UE and a security capability of the target user plane gateway. Further, the target security algorithm may be determined with reference to a service type or security requirement information of a service. If the user plane gateway (including the target user plane gateway) can support all security algorithms, the target security algorithm may be directly determined based on the security capability of the UE, or may be determined based on the security capability of the UE and the security requirement information of the service.

In this embodiment, the target security algorithm may be determined by the access and mobility management network element, the target session management network element, or the target user plane gateway. This is not limited in this application.

If the target security algorithm is determined by the access and mobility management network element, the access and mobility management network element may determine the target security algorithm according to the method described in the implementation 1 in the foregoing method 200.

If the target security algorithm is determined by the target session management network element, the target session management network element may obtain the security capability of the UE in advance, for example, may obtain the security capability of the UE from the access and mobility management network element, where for example, the access and mobility management network element adds the security capability of the UE to the second PDU session establishment request; and/or may obtain the security capability of the UE from a unified data management network element or a policy control network element, and request to obtain the security capability of the target user plane gateway from the target user plane gateway, for example, obtain the security capability of the target user plane gateway from the target user plane gateway by using an N4 interface message. The target session management network element may determine the target security algorithm based on the security capability of the UE and the security capability of the target user plane gateway.

The target session management network element may further obtain the service type or the security requirement information of the service. For example, the access and mobility management network element adds the service type or the security requirement information of the service to the second PDU session establishment request, so that the target session management network element further determines the target security algorithm based on the security capability of the UE, the security requirement information of the service, and the security capability of the target user plane gateway.

If the target security algorithm is determined by the target user plane gateway, the target session management network element may send the security capability of the UE to the target user plane gateway in advance, for example, add the security capability of the UE to the third PDU session establishment request. The target user plane gateway may determine the target security algorithm based on the security capability of the UE and the security capability of the target user plane gateway.

The target user plane gateway may further obtain the service type or the security requirement information of the service. For example, the target session management network element adds the service type or the security requirement information of the service to the third PDU session establishment request, so that the target user plane gateway further determines the target security algorithm based on the security capability of the UE, the security requirement information of the service, and the security capability of the target user plane gateway.

A specific method for determining the target security algorithm by each core network element is described in detail with reference to the implementation 1 to the implementation 3 in the foregoing method 200. For brevity, details are not described herein again.

2. Target Security Key

In this embodiment, the target security key may be generated by the access and mobility management network element, the target session management network element, or the target user plane gateway. This is not limited in this application.

If the target security key is generated by the access and mobility management network element, the access and mobility management network element may generate the target security key according to the method described in the implementation A in the foregoing method 200, and send the generated target security key to the target user plane gateway.

Alternatively, the access and mobility management network element may generate a plurality of security keys based on the foregoing implementation D, select one of the plurality of security keys as the target security key, and send the target security key to the target user plane gateway.

Alternatively, the access and mobility management network element may generate a plurality of UPF transmission root keys, select one of the plurality of UPF transmission root keys as the UPF transmission root key used to generate the target security key, and further generate the target security root key; or send the UPF transmission root key to the target session management network element, and a subsequent network element (for example, the target session management network element or the target user plane gateway) generates the target security key.

If the target security key is generated by the session management network element, the target session management network element may generate the target security key according to the method described in the implementation B in the foregoing method 200, and send the generated target security key to the target user plane gateway.

Alternatively, the target session management network element may obtain a plurality of pre-generated security keys from the source session management network element, select one of the plurality of security keys as the target security key, and send the target security key to the target user plane gateway. Alternatively, the target session management network element may generate a plurality of security keys by itself, select one of the plurality of security keys as the target security key, and send the target security key to the target user plane gateway.

Alternatively, the target session management network element may obtain a source security context from the source session management network element, and generate a plurality of new security keys. For example, the plurality of new security keys are generated based on source session information in the source security context and/or session management related information, for example, the UPF transmission root key, a source security key, and a flow-based key in a source PDU session. The target session management network element may select one of the plurality of new security keys as the target security key, and send the target security key to the target user plane gateway.

Alternatively, the target session management network element may generate a plurality of UPF transmission root keys, select one of the plurality of UPF transmission root keys as the UPF transmission root key used to generate the target security key, and further generate the target security root key; or send the UPF transmission root key to the user plane gateway.

If the target security key is generated by the target user plane gateway, the target user plane gateway may generate the target security key according to the method described in the implementation C in the foregoing method 200.

In addition, a security context may be based on UE granularity. Different user plane gateways and different session management network elements may share a same security context. In other words, when the UE remains unchanged, the source security context may be directly used as the target security context.

Step 307: The UE obtains the target security context.

A specific process of step 307 is the same as that of step 207. Because step 207 is described in detail in the foregoing method 200. For brevity, details are not described herein again.

Step 308: The target user plane gateway sends a security activation instruction to the UE.

Step 309: The UE activates user plane security protection according to the security activation instruction.

Step 310: The UE sends a security activation complete indication to the target user plane gateway, to notify the target user plane gateway that the UE has activated user plane security protection. Correspondingly, in step 310, the target user plane gateway receives the security activation complete indication from the UE.

Step 311: The target user plane gateway activates user plane security protection.

Optionally, the method 300 further includes step 312: The UE deletes a security context related to the source PDU session.

Optionally, the method 300 further includes step 313: The access and mobility management network element deletes the security context related to the source PDU session.

Optionally, the method 300 further includes step 314: The source session management network element deletes the security context related to the source PDU session.

Optionally, the method 300 further includes step 315: The source user plane gateway deletes the security context related to the source PDU session.

Optionally, the method 300 further includes step 316: The access and mobility management network element releases a resource of a source PDU session connection.

Optionally, before step 312, the method 300 further includes step 317: The UE transfers a QoS flow in the source PDU session to a target PDU session.

It should be understood that specific processes of step 307 to step 317 are the same as the specific processes of step 207 to step 217 in the method 200. For brevity, details are not described herein again.

It should be further understood that step 312 to step 315 do not necessarily need to be performed at the same time. The UE and the core network element may determine, by themselves after a target PDU session establishment procedure is completed, an occasion for deleting the security context related to the source PDU session. An occasion at which each network element deletes the security context related to the source PDU session is not limited in this application.

It should be further understood that step 312 to step 317 may be performed after step 311, or may be performed after step 301, for example, performed before step 303. If step 312 and step 313 are performed after step 311, that is, the target PDU session is established before the source PDU session is released, this procedure may correspond to the SSC mode 3. If step 312 to step 317 are performed after step 301, that is, the source PDU session is released before the target PDU session is established, this procedure may correspond to the SSC mode 2.

Based on the foregoing method, the UE and the network side complete user plane gateway switching, session management network element switching, and PDU session reestablishment. Based on a newly established PDU session, secure data transmission may be performed between the UE and a new user plane gateway based on a new security context, thereby implementing end-to-end security protection between the UE and the user plane gateway. Moreover, during user plane gateway switching and session management network element switching, a security context related to an old PDU session is deleted. Therefore, security is higher.

It should be noted that specific processes of reestablishing the PDU session and obtaining the security context when the access and mobility management network element remains unchanged are described in detail in the methods 200 and 300 that are described above, but this should not constitute any limitation on this application. When the access and mobility management network element changes, the methods provided above may still be applicable. After switching of the access and mobility management network element is completed, the user plane gateway and/or the session management network element may be switched based on the procedure of the method 200 or 300 provided above.

The following briefly describes a switching process of the access and mobility management network element. Core network elements in this process may include a source access and mobility management network element, a target access and mobility management network element, the session management network element, and the user plane gateway. It should be understood that the session management network element and the user plane gateway may be respectively a session management network element and a user plane gateway in a link carrying the source PDU session, and may also be referred to as a source session management network element and a source user plane gateway respectively.

First, the source access and mobility management network element receives a switching request from an access network device, where the switching request is used to indicate that the access and mobility management network element needs to be switched. Correspondingly, the access network device sends the switching request to the source access and mobility management network element.

As described above, the access network device may determine, based on an operator policy and/or a network deployment coverage situation, whether the access and mobility management network element needs to be switched, and send the switching request to a source access and mobility management network element if the access and mobility management network element needs to be switched.

Then, the source access and mobility management network element determines the target access and mobility management network element.

The source access and mobility management network element may determine the target access and mobility management network element based on the received switching request. Alternatively, the access network device may indicate the target access and mobility management network element in the switching request, so that the source access and mobility management network element determines the target access and mobility management network element based on the switching request. This is not limited in this application.

Then, the source access and mobility management network element sends the source security context to the target access and mobility management network element. Correspondingly, the target access and mobility management network element receives the source security context from the source access and mobility management network element.

For example, the source security context may include but is not limited to one or more of a source security algorithm (including an encryption algorithm and an integrity protection algorithm), an algorithm identifier, a security capability of the UE, a source security key (including an encryption/decryption key and an integrity protection key), an intermediate key used to generate the source security key, a UPF transmission key, an index of a key, a key identifier, a life cycle of a key, a count value (for example, a NAS count, an NH, a timestamp, or an NCC) used to calculate the source security key, and a source security policy.

The source security context may further include a plurality of security keys generated by the source access and mobility management network element. Alternatively, the source security context may include source session information and a session management-related security context, so that the target access and mobility management network element generates a plurality of new security keys.

The source security context may alternatively be a shared security context corresponding to the UE.

Optionally, the source access and mobility management network element sends the source security context by using a Namf_Communication_CreatetUE Context request.

The Namf_Communication_CreateUEContext request may further include a mapping relationship between a PDU session identifier and a session management network element and/or an SMF identifier corresponding to the PDU session, so that the target access and mobility management network element determines, based on the mapping relationship, the session management network element in the link that carries the source PDU session.

Then, the target access and mobility management network element sends a Nsmf_PDUSession_UpdateSMContext request to the session management network element, where the Nsmf_PDUSession_UpdateSMContext request carries the source security context.

If the user plane gateway or the session management network element does not change in a subsequent procedure, the session management network element may complete the session update according to a procedure in an existing technology. The session management network element may send the source security context to the user plane gateway based on the received Nsmf_PDUSession_UpdateSMContext request and by using an N4 session modification request (N4 Session Modification Request). Alternatively, the session management network element determines information about the target security context based on information such as the source security context and the security capability of the target user plane gateway. If the session management network element changes, a target SMF may obtain the source security context from a source AMF and/or a source SMF via a target AMF, or may obtain other information that may be used to determine the target security context, for example, an input parameter, a UPF transmission root key, or an intermediate key used to generate the target security key, to help the user plane gateway obtain the target security context.

Then, the access network device receives a UE context release command from the source access and mobility management network element.

Subsequently, the access network device releases a resource, and sends a UE context release complete command to the source access and mobility management network element.

Next, the UE may obtain the target security context. The UE may obtain indications of a target security policy and the target security algorithm from the user plane gateway.

The UE may generate the target security key based on the input parameter sent by the target access and mobility management network element; the UE may determine the target security key in the plurality of pre-generated security keys based on the index sent by the target access and mobility management network element; or the UE may directly use the shared security context as the target security context. A specific method for obtaining the target security key by the UE corresponds to the method for obtaining the target security key by the user plane gateway.

The specific method for obtaining the target security context by the user plane gateway and the UE is described in detail above. For brevity, details are not described herein again.

If the user plane gateway or the session management network element changes in a subsequent procedure, the target PDU session is reestablished based on the procedure in the method 200 or the method 300.

Based on the foregoing method, the target access and mobility management network element may obtain the source security context and the related information of the source PDU session from the source access and mobility management network element, so that the user plane gateway and the UE obtain the target security context. Based on a newly established PDU session, secure data transmission may be performed between the UE and the user plane gateway based on a new security context, thereby implementing end-to-end security protection between the UE and the user plane gateway.

It should be understood that sequence numbers of the foregoing processes do not mean execution orders in the foregoing embodiments. The execution sequences of the processes should be determined based on functions and internal logic of the processes, and should not be construed as any limitation on the implementation processes of the embodiments of this application.

The security context obtaining method provided in the embodiments of this application is described above in detail with reference to FIG. 3 and FIG. 4. A security context obtaining apparatus and a security context obtaining device that are provided in the embodiments of this application are described in detail below with reference to FIG. 5 and FIG. 6.

Figure 5:
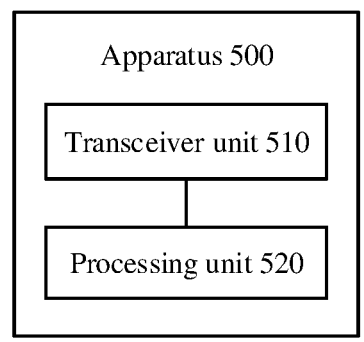
FIG. 5 is a schematic block diagram of a security context obtaining apparatus according to an embodiment of this application.

FIG. 5 is a schematic block diagram of a security context obtaining apparatus 500 according to an embodiment of this application. As shown in the figure, the apparatus 500 may include a transceiver unit 510 and a processing unit 520.

In a possible design, the apparatus 500 may be the user plane gateway in the foregoing method embodiments, or may be a chip configured to implement a function of the user plane gateway in the foregoing method embodiments. Specifically, the apparatus 500 may correspond to the user plane gateways in the methods 200 and 300 according to the embodiments of this application. The apparatus 500 may include units configured to perform the methods performed by the user plane gateways in the method 200 in FIG. 3 and the method 300 in FIG. 4. In addition, the units in the apparatus 500 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

In another possible design, the apparatus 500 may be the UE in the foregoing method embodiments, or may be a chip configured to implement a function of the UE in the foregoing method embodiments. Specifically, the apparatus 500 may correspond to the UEs in the methods 200 and 300 according to the embodiments of this application. The apparatus 500 may include units configured to perform the methods performed by the UEs in the method 200 in FIG. 3 and the method 300 in FIG. 4. In addition, the units in the apparatus 500 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

In another possible design, the apparatus 500 may be the access and mobility management network element in the foregoing method embodiments, or may be a chip configured to implement a function of the access and mobility management network element in the foregoing method embodiments. Specifically, the apparatus 500 may correspond to the access and mobility management network elements in the methods 200 and 300 according to the embodiments of this application. The apparatus 500 may include units configured to perform the methods performed by the access and mobility management network elements in the method 200 in FIG. 3 and the method 300 in FIG. 4. In addition, the units in the apparatus 500 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

In another possible design, the apparatus 500 may be the session management network element in the foregoing method embodiments, or may be a chip configured to implement a function of the session management network element in the foregoing method embodiments. Specifically, the apparatus 500 may correspond to the session management network elements in the methods 200 and 300 according to the embodiments of this application. The apparatus 500 may include units configured to perform the methods performed by the session management network elements in the method 200 in FIG. 3 and the method 300 in FIG. 4. In addition, the units in the apparatus 500 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

Figure 6:
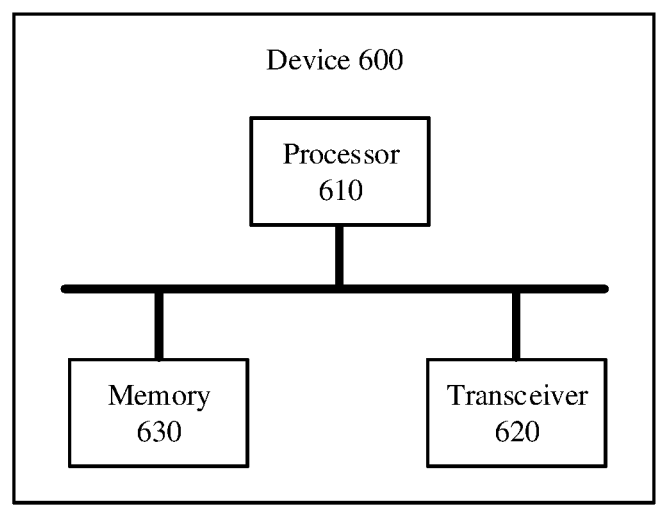
FIG. 6 is a schematic block diagram of a security context obtaining device according to an embodiment of this application.

It should be understood that the transceiver unit in the apparatus 500 may correspond to a transceiver 610 in a device 600 shown in FIG. 6, and the processing unit 520 in the apparatus 500 may correspond to a transceiver 620 in the device 600 shown in FIG. 6.

FIG. 6 is a schematic block diagram of a security context obtaining device 600 according to an embodiment of this application. As shown in the figure, the device 600 includes the processor 610 and the transceiver 620. The processor 610 is coupled to a memory, and is configured to execute an instruction stored in the memory, to control the transceiver 620 to send a signal and/or receive a signal. Optionally, the device 600 further includes a memory 630, configured to store an instruction.

It should be understood that the processor 610 and the memory 630 may be integrated into one processing apparatus, and the processor 610 is configured to execute program code stored in the memory 630, to implement the foregoing function. During specific implementation, the memory 630 may alternatively be integrated into the processor 610, or may be independent of the processor 610.

It should be further understood that the transceiver 620 may include a receiver (or referred to as a receive machine) and a transmitter (or referred to as a transmit machine). The transceiver may further include an antenna. There may be one or more antennas.

In a possible design, the device 600 may be the user plane gateway in the foregoing method embodiments, or may be a chip configured to implement a function of the user plane gateway in the foregoing method embodiments. Specifically, the device 600 may correspond to the user plane gateways in the methods 200 and 300 according to the embodiments of this application. The device 600 may include units configured to perform the methods performed by the user plane gateways in the method 200 in FIG. 3 and the method 300 in FIG. 4. In addition, the units in the device 600 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

In another possible design, the device 600 may be the UE in the foregoing method embodiments, or may be a chip configured to implement a function of the UE in the foregoing method embodiments. Specifically, the device 600 may correspond to the UEs in the methods 200 and 300 according to the embodiments of this application. The device 600 may include units configured to perform the methods performed by the UEs in the method 200 in FIG. 3 and the method 300 in FIG. 4. In addition, the units in the device 600 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

In another possible design, the device 600 may be the access and mobility management network element in the foregoing method embodiments, or may be a chip configured to implement a function of the access and mobility management network element in the foregoing method embodiments. Specifically, the device 600 may correspond to the access and mobility management network elements in the methods 200 and 300 according to the embodiments of this application. The device 600 may include units configured to perform the methods performed by the access and mobility management network elements in the method 200 in FIG. 3 and the method 300 in FIG. 4. In addition, the units in the device 600 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

In another possible design, the device 600 may be the session management network element in the foregoing method embodiments, or may be a chip configured to implement a function of the session management network element in the foregoing method embodiments. Specifically, the device 600 may correspond to the session management network elements in the methods 200 and 300 according to the embodiments of this application. The device 600 may include units configured to perform the methods performed by the session management network elements in the method 200 in FIG. 3 and the method 300 in FIG. 4. In addition, the units in the device 600 and the foregoing other operations and/or functions are separately intended to implement corresponding procedures of the method 200 in FIG. 3 or the method 300 in FIG. 4. It should be understood that a specific process in which each unit performs the foregoing corresponding steps is described in detail in the foregoing method embodiments. For brevity, details are not described herein again.

According to the methods provided in the embodiments of this application, this application further provides a computer program product. The computer program product includes computer program code. When the computer program code is run on a computer, the computer is enabled to perform the security context obtaining method in any one of the embodiments shown in FIG. 3 and FIG. 4.

According to the methods provided in the embodiments of this application, this application further provides a computer-readable medium. The computer-readable medium stores program code. When the program code is run on a computer, the computer is enabled to perform the security context obtaining method in any one of the embodiments shown in FIG. 3 and FIG. 4.

According to the method provided in the embodiments of this application, this application further provides a system. The system includes the user plane gateway, the session management network element, the access and mobility management network element, the access network device, and the UE that are described above.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network elements in the foregoing apparatus embodiments may totally correspond to the network elements in the method embodiments. A corresponding module or unit performs a corresponding step. For example, a transceiver unit (transceiver) performs a receiving step or a sending step in the method embodiments, and a processing unit (a processor) may perform another step other than the sending step and the receiving step. For a function of a specific unit, refer to the corresponding method embodiments. There may be one or more processors.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular characteristics, structures, or features may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that illustrative logical blocks (illustrative logical block) and steps (step) described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium such as a USB flash drive, a removable hard disk, a read-only memory, (ROM), a random access memory (RAM), a magnetic disk, or an optical disc, that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A security context obtaining method, comprising:
receiving, by a user plane gateway, a packet data unit (PDU) session establishment request, wherein the PDU session establishment request is used to request to establish a PDU session between the user plane gateway and user equipment (UE), and the PDU session is carried between the UE and a service server of a data network;
obtaining, by the user plane gateway, a security context used for the PDU session; and
activating, by the user plane gateway, user plane security protection based on the security context;
wherein the security context comprises a security key; and
the obtaining, by the user plane gateway, of the security context used for the PDU session comprises:
receiving, by the user plane gateway, an intermediate key and an input parameter; and
generating, by the user plane gateway, a user plane function (UPF) transmission root key based on the intermediate key and the input parameter and using a key derivation function, and
generating, by the user plane gateway, the security key based on the UPF transmission root key;
wherein the input parameter includes at least one of a UPF identifier, a session identifier, a network identifier, or a fresh parameter; and wherein the fresh parameter includes an arbitrary or non-repeated random number that is used only once, a random number, a counter, a non-access stratum (NAS) message counter, a timestamp, and/or a next hop chaining counter; and
wherein the intermediate key is related to a key set identifier or is derived from another intermediate key using another key derivation function.

2. A security context obtaining method, comprising:
sending, by user equipment (UE), a packet data unit (PDU) session establishment request, wherein the PDU session establishment request is used to request to establish a target PDU session between a user plane gateway and the UE, and the target PDU session is carried between the UE and a service server of a data network;
obtaining, by the UE, a security context used for the target PDU session;
activating, by the UE, user plane security protection based on the security context;
wherein the security context comprises a security key; and
the obtaining, by the UE, of the security key comprises:
receiving, by the UE, an input parameter;
obtaining, by the UE, an intermediate key; and
generating, by the UE, a user plane function (UPF) transmission root key based on the input parameter and the intermediate key and using a key derivation function, and
generating, by the UE, the security key based on the UPF transmission root key;
wherein the input parameter includes at least one of a UPF identifier, a session identifier, a network identifier, or a fresh parameter; and wherein the fresh parameter includes an arbitrary or non-repeated random number that is used only once, a random number, a counter, a non-access stratum (NAS) message counter, a timestamp, and/or a next hop chaining counter; and
wherein the intermediate key is related to a key set identifier or is derived from another intermediate key using another key derivation function.

3. The method according to claim 2, further comprising:
deleting, by the UE, the security context used for a source PDU session, wherein a link carrying the target PDU session is different from a link carrying the source PDU session in at least one of the following: a user plane gateway, a session management network element, and/or an access and mobility management network element.

4. A security context obtaining apparatus, comprising:
a transceiver configured to receive a packet data unit (PDU) session establishment request, wherein the PDU session establishment request is used to request to establish a PDU session between a user plane gateway and user equipment UE, and the PDU session is carried between the UE and a service server of a data network; and
a processor configured to:
obtain a security context used for the PDU session, and
activate user plane security protection based on the security context;
wherein the security context comprises a security key;
the transceiver is further configured to receive an intermediate key and an input parameter; and
the processor is further configured to:
generate a user plane function (UPF) transmission root key based on the intermediate key and the input parameter and using a key derivation function, and
generate the security key based on the UPF transmission root key;
wherein the input parameter includes at least one of a UPF identifier, a session identifier, a network identifier, or a fresh parameter; and wherein the fresh parameter includes an arbitrary or non-repeated random number that is used only once, a random number, a counter, a non-access stratum (NAS) message counter, a timestamp, and/or a next hop chaining counter; and
wherein the intermediate key is related to a key set identifier or is derived from another intermediate key using another key derivation function.

5. A security context obtaining apparatus, comprising:
a transceiver configured to send a packet data unit (PDU) session establishment request, wherein the PDU session establishment request is used to request to establish a target PDU session between a user plane gateway and the (UE), and the target PDU session is carried between the UE and a service server of a data network; and a processor configured to:
  obtain a security context used for the target PDU session, and
  activate user plane security protection based on the security context;
wherein the security context comprises a security key;
the transceiver is further configured to receive an input parameter;
the processor is further configured to:
  obtain an intermediate key; and
  generate a user plane function (UPF) transmission root key based on the input parameter and the intermediate key and using a key derivation function, and
  generate the security key based on the UPF transmission root key;
wherein the input parameter includes at least one of a UPF identifier, a session identifier, a network identifier, or a fresh parameter; and wherein the fresh parameter includes an arbitrary or non-repeated random number that is used only once, a random number, a counter, a non-access stratum (NAS) message counter, a timestamp, and/or a next hop chaining counter; and
wherein the intermediate key is related to a key set identifier or is derived from another intermediate key using another key derivation function.

6. The apparatus according to claim 5, wherein the processor is further configured to delete the security context used for a source PDU session, wherein a link carrying the target PDU session is different from a link carrying the source PDU session in at least one of the following: a user plane gateway, a session management network element, and/or an access and mobility management network element.

7. A non-transitory computer-readable medium storing computer code such that the computer code is executable by a computer system to perform the method of claim 1.

8. A non-transitory computer-readable medium storing computer code such that the computer code is executable by a computer system to perform the method of claim 2.

* * * * *